(12) United States Patent
Dawn et al.

(10) Patent No.: US 11,151,457 B1
(45) Date of Patent: Oct. 19, 2021

(54) PREDICTOR GENERATION GENETIC ALGORITHM

(71) Applicant: Castlight Health, Inc., San Francisco, CA (US)

(72) Inventors: Soubhik Dawn, San Francisco, CA (US); Ted Studley, San Francisco, CA (US)

(73) Assignee: Castlight Health, Inc., San Francisco, CA (US)

( * ) Notice: Subject to any disclaimer, the term of this patent is extended or adjusted under 35 U.S.C. 154(b) by 1113 days.

(21) Appl. No.: 15/668,678

(22) Filed: Aug. 3, 2017

(51) Int. Cl.
*G06N 3/12* (2006.01)
*G06N 7/00* (2006.01)
*G06N 5/02* (2006.01)

(52) U.S. Cl.
CPC ............. *G06N 3/126* (2013.01); *G06N 5/025* (2013.01); *G06N 7/005* (2013.01)

(58) Field of Classification Search
CPC ......... G06N 3/126; G06N 5/025; G06N 7/005
See application file for complete search history.

(56) References Cited

U.S. PATENT DOCUMENTS

| 9,582,761 | B2 * | 2/2017 | Cox | G06Q 30/0621 |
| 2003/0004903 | A1 | 1/2003 | Kehder et al. | |
| 2012/0089620 | A1 | 4/2012 | Castellanos et al. | |
| 2016/0253463 | A1 | 9/2016 | Shu et al. | |

FOREIGN PATENT DOCUMENTS

JP 2013114664 A 6/2013

OTHER PUBLICATIONS

Weiss, G. "Timeweaver: A genetic algorithm for identifying predictive patterns in sequences of events." Proceedings of the Genetic and Evolutionary Computation Conference. vol. 1. 1999. (Year: 1999).*
Buelow, "Genetically Enhanced Parametric Design in the Exploration of Architectural Solutions," Structures and Architecture Beyond their Limits, 2016, eight pages.
Carvalho et al., "A Hybrid Decision Tree/Genetic Algorithm Method for Data Mining," Information Sciences, 2004, twenty-three pages.
(Continued)

*Primary Examiner* — Benjamin P Geib
(74) *Attorney, Agent, or Firm* — Fenwick & West LLP

(57) ABSTRACT

A method of generating predictor rules using a genetic algorithm for predicting at least one target event associated with a given entity, the entity having a combination of an entity type and one or more attributes. The method comprises partitioning records data into a model generation set and a model testing set. A first generation of predictor rules is determined using the records in the model generation set, and subsequent generations are constructed by iteratively identifying a first subset of predictor rules based on a precision measure of each predictor rule and identifying a second subset of predictor rules based on a recall measure of each predictor rule and generating the subsequent generation by OR combining the predictor rules of the first subset and by AND combining the predictor rules of the second subset. Construction of the predictor rule population is terminated in response to a termination criteria being met.

20 Claims, 4 Drawing Sheets

(56) References Cited

OTHER PUBLICATIONS

Etemadi et al., "A genetic programming model for bankruptcy prediction: Empirical evidence from Iran," Expert Systems with Applications, 2008, nine pages.

Fidelis et al., "Discovering comprehensible classification rules with a genetic algorithm," Proceedings of the 2000 Congress on IEEE, Evolutionary Computation, 2000, pp. 805-810.

Kim et al, "Maintaining case-based reasoning systems using a genetic algorithms approach," Expert Systems with Applications, vol. 21, Issue 3, Oct. 2001, pp. 139-145.

Lorena et al., "Constructive Genetic Algorithm for Clustering Problems," obtained online Dec. 30, 2016 from https://www.researchgate.net/profile/Luiz_Lorena/publication/11824031_Constructive_Genetic_Algorithm_for_Clustering_Problems/links/00463530335c12fcc9000000/Constructive-Genetic-Algorithm-for-Clustering-Problems.pdf, 2001, thirty-eight pages.

Mahmood et al., "A Novel Pruning Approach Using Expert Knowledge," Emerging Trends in Robotics and Communication Technologies (INTERACT), 2010 International Conference on IEEE, 2010, pp. 33-38.

Mahmoudi et al., "Parameter Determination of Chaboche Kinematic Hardening Model Using a Multi Objective Genetic Algorithm," Computational Materials Science 50, 2011, pp. 1114-1122.

Owais et al., "Query Optimization by Genetic Algorithms," Proceedings of the Dateso 2005 Workshop (Databases, Texts, Specifications, and Objects 2005), Apr. 2005, pp. 125-137.

Pappa et al., "A multiobjective genetic algorithm for attribute selection," Proc. 4th Int. Conf. on Recent Advances in Soft Computing (RASC-2002). Nottingham Trent University, 2002, pp. 116-121.

Quinlan, "Simplifying Decision Trees," Massachusetts Institute of Technology Artificial Intelligence Laboratory, Dec. 1986, nineteen pages.

Reihanian et al., "Application of neural network and genetic algorithm to powder metallurgy of pure iron," Materials & Design, vol. 32, Issue 6, Jun. 2011, pp. 3183-3188.

Rodríguez-Vázquez et al., "Multiobjective Genetic Programming: A Nonlinear System Identification Application," *Late Breaking Papers* at the 1997 genetic programming conference, 1997, pp. 207-212.

Sanchez et al., "Genetic Algorithms and Fuzzy Logic Systems: Soft Computing Perspectives," Advances in Fuzzy Systems—Applications and Theory vol. 7, 1997, four pages.

Sarkar et al., "A clustering algorithm using an evolutionary programming-based approach," Pattern Recognition Letters, vol. 18 Issue 10, Oct. 1997, pp. 975-986.

Srinivasan et al., "Evolutionary multi objective optimization for rule mining: a review," Artificial Intelligence Review, Oct. 2011, vol. 36, pp. 205-248.

Takale, "Constructing predictive models to assess the importance of variables in epidemiological data using a genetic algorithm system employing decision trees," Thesis Submitted to the Graduate School of the University of Minnesota, Aug. 2004, ninety-four pages.

Tan et al., "Evolutionary computing for knowledge discovery in medical diagnosis," Artificial Intelligence in Medicine, 2003, vol. 27, pp. 129-154.

Uguz, "A two-stage feature selection method for text categorization by using information gain, principal component analysis and genetic algorithm," Knowledge-Based Systems, vol. 24, Issue 7, Oct. 2011, pp. 1024-1032.

\* cited by examiner

PREDICTOR GENERATION GENETIC ALGORITHM

BACKGROUND

Technical Field

This description generally relates to machine learning systems and methods, and particularly to using a genetic algorithm for data mining applications in large scale decision support database environments.

Fields of Classification

Class 706/12, 706/13, 706/45, 707/600.

Data mining can be a powerful tool for companies to observe patterns or relationships among data. By analyzing large amounts of data, companies are able to gather information about the data and determine relationships between certain factors or attributes that can be used to make informed decisions. In some instances, it may be desirable to be able to predict future outcomes based on past occurrences. A rules-based analysis predicts a target outcome by applying predictor rules to one or more past occurrences. In this approach it is necessary to generate the predictor rules, and one way to do this is to use the past occurrences as a basis for the prediction rules. However, a problem with existing approaches to generating predictor rules by analyzing past occurrences is that the rules may only be able to predict the past occurrences occurring again in the future. In other words, the predictor rules may potentially fail to predict other types of occurrences for which there are no prior occurrences in the existing data set. However, the absence of evidence of a past occurrence is not evidence of absence of the past occurrence, and thus, a problem in the existing solutions which necessarily require prior occurrences as basis for predicting future occurrences.

In addition, another problem with past methods of predictive modeling, such as deterministic or probabilistic analyses, is that they do not allow for a controlled degree of variability that would generate predictor rules that are capable of predicting occurrences for which there is no past evidence. Accordingly, there is a need for a predictive model that is capable of algorithmically generating predictor rules that satisfy specific criteria.

SUMMARY

A method of generating a population of predictor rules using a genetic algorithm for predicting at least one target event associated with a given entity, the entity having a combination of an entity type and one or more attributes. The method comprises obtaining records data from an event database and partitioning the records data to select a first subset of records to form a model generation set and a second subset of records to form a model testing set. A first generation of predictor rules is determined using records in the model generation set, wherein each predictor rule consists of a combination of the entity type and the one or more attributes and a logical expression of at least one predictor event. A predictor rule population is constructed by iteratively identifying a first subset of the predictor rules, wherein each predictor rule satisfying a precision measure for matching one or more predictor events in the model testing set of records data, and identifying a second subset of the predictor rules, wherein each predictor rule satisfying a recall criteria for matching one or more predictor events in the model testing set of records data. A subsequent generation of predictor rules is generated for the predictor rule population by OR combining the predictor events in pairs of the predictor rules of the first subset and by AND combining predictor events in pairs of the predictor rules of the second subset. Construction of the predictor rule population is terminated in response to a termination criteria being met.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
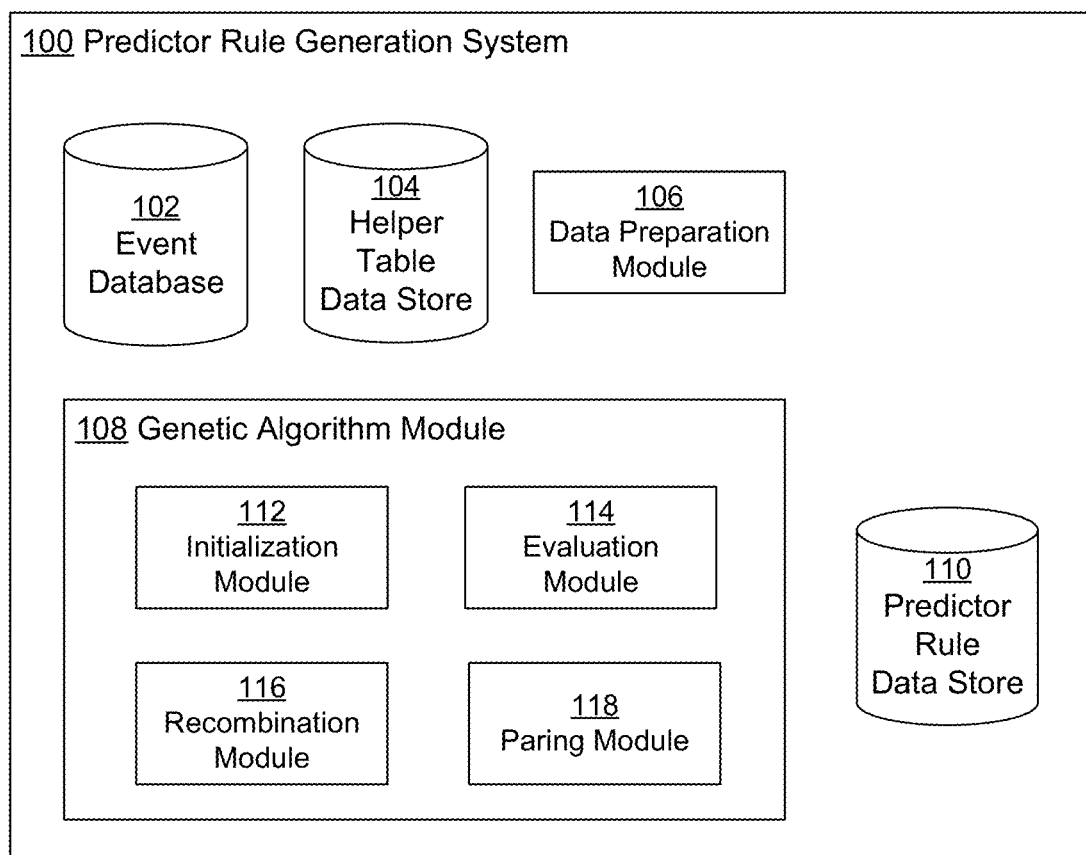
FIG. 1 illustrates a system architecture for one embodiment of the invention.

FIG. 1 illustrates a system architecture for one embodiment of the invention. A predictor rule generation system 100 aims to generate a compilation of predictor rules for predicting several events that are associated with an entity having a certain combination of an entity type and one or more attributes. To achieve this, the predictor rule generation system 100 uses a genetic algorithm that iteratively constructs generations of predictor rules until a final generation of predictor rules is generated which meets a termination condition. In the embodiment of FIG. 1, each predictor rule is a gene. The genetic algorithm module 108 executes a genetic algorithm to generate predictor rules. A single cycle of the genetic algorithm by the genetic algorithm module 108 creates a population of predictor rules for a single target event. Within a single cycle of the genetic algorithm, there are several sub-cycles, wherein each sub-cycle creates a set of predictor rules that predict the target event for a given combination of an entity type and one or more attributes. Each sub-cycle comprises several generations of predictor rules to create a final generation of predictor rules for predicting a single target event using the certain combination of entity type and one or more attributes. Therefore, the accumulation of final generation predictor rules from the several sub-cycles produces a larger population of predictor rules for a single target event across multiple different combinations of entity type and attributes. To generate multiple sets of predictor rules for multiple different target events, the system is used multiple times over. As a collective result, several cycles of the genetic algorithm form a compilation of predictor rules configured to predict several target events associated with different combinations of entity type and attributes.

In the embodiment of FIG. 1, the predictor rule generation system 100 extracts information from a data set that is used as input into the genetic algorithm. The data set includes historical data of occurrences, where each occurrence is a specific instance of events associated with an entity. In the data set, there may be thousands, hundreds of thousands, even millions of events, and correspondingly large numbers of different entity types and attribute combinations. Each entity includes a combination of an entity type and one or more attributes. A predictor rule is a logical, programmatically evaluable expression that represents whether or not an entity (having a certain combination of entity type and attributes) associated with one or more events is a predictor for the entity being associated with a target event. In the embodiment of FIG. 1, the predictor rule generation system 100 includes an event database 102, a data preparation module 106, a helper table data store 104, a genetic algorithm module 108, and a predictor rule data store 110.

The event database 102 stores the raw data set that is parsed through and prepared for use by the genetic algorithm module 108. The data may be stored in a conventional relational or flat file database that is accessible to the data preparation module 106 and the genetic algorithm module 108. The event database 102 may be a local or a remote database.

The data stored in the event database 102 preferably comprises data that represents events that have occurred at specific dates or times by one or more entities. As previously described, an occurrence is a specific instance of an event that is associated with an entity having an entity type and one or more attributes. An entity may be associated with a specific combination of an entity type and one or more attributes, also herein called a synthesis category. The event database 102 may store data concerning each occurrence in the format of an event or data log, purchase order, repair order, maintenance record, invoice, claim, job record, or any other type of record of an event occurring which can have metadata associating the event with an entity. The following are examples of entities and their possible entity types, by way of illustration:

TABLE 1

Examples of Entities and associated Entity Types, Attributes, and Events.
Example Entities, Types, and Events

| Entity | Entity Types | Attributes | Synthesis Categories | Events |
|---|---|---|---|---|
| Machine Examples: 1. Automobile 2. Computer 3. Appliance | Product Types Examples: 1. Coupe, Convertible, Sedan, SUV, Truck, Van, etc. 2. Laptop, Desktop, Tablet, etc. 3. Dishwasher, Washer, Dryer, etc. | Features Examples: 1. Year of Manufacture, Odometer Reading, Transmission Type etc.) 2. Operating System, Memory, Storage Type, etc. 3. Make, Manufacture Year, Wattage, Energy Star rating, etc. | Examples: 1. (Coupe, 2000 Model, 70k Miles, Automatic Transmission) 2. (Laptop, Windows XP, 64 GB, HDD) 3. (Washer, General Electric, 2015, 1000 W, Energy Star rated) | Examples: 1. Transmission Failure, Failed Brakes, Defective Airbags, Faulty Sensors, etc. 2. Malware, Overheating, Failing Power, etc. 3. Water Drainage Issues, Faulty Temperature Sensor, Jammed Motor, etc. |
| Service Provider Examples: 1. Medical Care Provider 2. Construction Provider | Provider Types Examples: 1. Practitioner, Facility, Hospital, etc.; 2. General Contractor, Subcontractor, Firm, etc. | Specialties Examples: 1. Oncologist, Radiologist, Family Care, etc. 2. Commercial, Residential, Industrial, etc. | Examples: 1. (Hospital, Radiology) 2. (General Contractor, Commercial) | Examples: 1. X-Ray, Cataract Surgery, Flu Shot, etc. 2. HVAC, High Voltage, Plumbing, Roofing, etc. |
| Customer Examples: 1. Application User 2. Subscription User | Customer Types Examples: 1. Mobile User, Desktop User, Wearable Device User, Personal Assistant User, etc. 2. Online Subscriber, Offline Subscriber, etc. | Demographics Examples: 1. Gender, Location Type, Household Income, Age, etc. 2. Marital Status, Gender, Education Level, Age, etc. | Examples: 1. (Mobile User, Urban, Household Income > $150 K, Age 25) 2. (Online Subscriber, Married, Female, Master's Degree, Age 40) | Examples: 1. Interests (News, Weather, Sports, etc.), Data Usage, etc. 2. On-time payments, Month-to-Month Subscriptions, Referrals, etc. |

In the embodiment of FIG. 1, each record details at least one occurrence, which comprises an event, an entity associated with the event, and the synthesis category (entity type and one or more attributes) associated with the entity. In some embodiments, each record may detail more than one occurrence for the same entity. The following are examples of information that may be found on an record comprising a medical claim, by way of illustration:

TABLE 2

Examples of medical claim records.
Example Records

| Record | Event | Entity | Entity Type | Attribute(s) |
| --- | --- | --- | --- | --- |
| 1 | X-Ray of Femur | SF Radiology Center | Imaging Center | Radiology and imaging services |
| 2 | Heart Transplant | Dr. Alice Chen | Practitioner | Cardiovascular Surgeon |
| 3 | Cataract Surgery | Dr. Alan Warren | Practitioner | Ophthalmologist |
| 4 | Flu Shot | Minute Clinic | Facility | Family Medicine |

The helper table data store 104 stores the helper tables generated by the predictor rule generation system 100. The helper tables stored within the helper table data store 104 include a Records helper table, an Events helper table, an Entities helper table, Synthesis Categories helper tables, Categorized Events helper tables, and Categorized Entities helper tables created by the data preparation module 106, which will be discussed in greater detail below. The helper table data store 104 may also store additional helper tables created by the genetic algorithm module 108. The helper tables stored in the helper table data store 104 are accessible by the genetic algorithm module 108. The construction and usage of the helper tables is further described below.

The data preparation module 106 pre-processes the raw data stored in the event database 102 and prepares the data for use by the genetic algorithm module 108. The data preparation module 106 may partition the data stored in the event database 102 into two or more sets of data. In the embodiment of FIG. 1, the stored data is separated into a model generation set and a model testing set. The model generation set is used by the genetic algorithm module 108 to generate the initial generations of predictor rules for each sub-cycle of the genetic algorithm module 108, while the model testing set is used by the genetic algorithm module 108 to evaluate a generation of predictor rules after a generation is created. Other data may be held in reserve for either use or testing. The data may be allocated to a set randomly or based on information associated with an occurrence or a record of the occurrence. Information associated with an occurrence or the corresponding record can include the event, entity, entity type, attributes, data source of the record, date or location of the occurrence, or any other identifiable characteristic relevant to the predictor rule. For example, in the embodiment of FIG. 1, the data is separated based on a data source of a record. For example, a data source of a medical record may be the physician or hospital that performed the procedure on the medical record. In this configuration, records from a first data source are part of the model generation set and are used to create an initial generation of predictor rules, and records from a second data source are part of the model testing set and are used to test each generation of predictor rules. Splitting the data into at least two sets allows the system 100 to evaluate how well predictor rules created using a first set of data apply to a second set of similar data from a different source. For example, in a database containing maintenance records for machine equipment, a predictor rule defines a prediction of a specific equipment malfunction code (e.g., Code 2) for a specific product model and product type (as the synthesis category) based on the occurrences of a different malfunction code (Code 1) in the maintenance records. Evaluating a predictor rule's ability to determine whether or not the association between an entity with a synthesis category and a first event is a predictor for the entity being associated with one or more other different events allows the system 100 to refine the generated predictor rules to produce an optimized set of predictor rules that are capable of predicting future outcomes at a certain performance level.

Since the model generation set is used to generate initial generations of predictor rules and the model testing set is used to evaluate each generation of predictor rules, the data preparation module 106 parses the data of each set to prepare it for the genetic algorithm module 108. For each data set, the data preparation module 106 parses the data to categorically organize the information associated with each record. In some embodiments, the data preparation module 106 may create one or more helper tables to group together key pieces of information gathered from each record, tabulate frequency of occurrence information for individual entities, synthesis categories, or event classes. By creating helper tables, the data preparation module 106 pre-computes the information that is needed by the genetic algorithm module 108, allowing for more efficient computing by the genetic algorithm module 108 during the generation of predictor rules. Storing key information in a helper table eliminates the need for the genetic algorithm module 108 to parse through the raw data of each set for each iteration of the genetic algorithm, resulting in faster processing and completion. This is particularly beneficial when generating predictor rules for many different target events, entities, or synthesis categories. In the embodiment of FIG. 1, the data preparation module 106 creates a Records helper table, an Events helper table, an Entities helper table, Synthesis Categories helper tables, Categorized Events helper tables, and Categorized Entities helper tables for the data in the model generation set and for the data in the model testing set. The helper tables described below may be created in a different order than is presented. In addition, the data preparation module 106 may create helper tables in addition to those described below that aid in synthesizing information at various steps of the genetic algorithm.

A Records helper table serves as a reference table for the information gathered from each record in the model generation set and in the model testing set. In the embodiment of FIG. 1, the data preparation module 106 parses each record of each data set to gather information from each record that may be relevant to a predictor rule. As previously described, each record details at least one occurrence, which comprises an event, an entity associated with the event, the entity type, and one or more attributes associated with the entity. In some embodiments, each record may detail one or more occurrences for the same entity. Records may include additional information such as a date and time, a location, or any other similar identifying information. The Records helper tables may be stored in the helper table data store 104.

An Events helper table serves as a reference table for the events found in the records of each data set. In the embodiment of FIG. 1, the data preparation module 106 identifies each event present in the records of each data set. The data preparation module 106 creates the Events helper table to store each identified event and associates each event with an event identifier that may be used as a key by the genetic algorithm module 108. For example, referring to Table 2, each individual event (e.g., X-Ray, Heart Transplant, etc.) may each be associated with its own unique identifier. For Example, Event X-Ray may have Event Identifier 3450. In some embodiments, the Events helper table may be created synchronously with the Records helper table as the data preparation module 106 analyzes the records, or the Events helper table may be created from the information in the Records helper table. In these embodiments, the data preparation module 106 may analyze the records of each data set to identify events or may analyze the information in the Records helper table. In some embodiments, the Records helper table may store information from the records in terms of the corresponding event identifier. In some embodiments, a separate Events helper table may be created for the model generation set and for the model testing set, or a single Events helper table may be created that stores the events from the records of both data sets. The Events helper tables are stored in the helper table data store 104. An example Events helper table is illustrated below in Table 3.

TABLE 3

An Events helper table for two example records.
Events Helper Table

| Event ID | Label | Description |
| --- | --- | --- |
| 0428 | cpt-84480 | Thyroid Hormone (T3) test |
| 0178 | cpt-59025 | Non-stress test, fetal Health |

An Entities helper table serves as a reference table for the entities found in the records of each data set. In the embodiment of FIG. 1, the data preparation module 106 analyzes the records of each data set to identify each entity present in the records. The data preparation module 106 creates the Entities helper table to store each identified entity and associates each entity with an entity identifier that may be used as a key by the genetic algorithm module 108 to request aggregate information for an entity. For example, referring to Table 2, each individual entity (e.g., SF Radiology Center, Dr. Alice Chen, etc.) may each be associated with its own unique identifier. For Example, Entity Dr. Alice Chen may have Entity Identifier 066301. In some embodiments, the Entities helper table may be created synchronously with the Records helper table as the data preparation module 106 analyzes the records, or the Entities helper table may be created from the information in the Records helper table. In these embodiments, the data preparation module 106 may analyze the records of each data set to identify entities or may analyze the information in the Records helper table. In some embodiments, the Records helper table may store information from the records in terms of the corresponding entity identifier. In some embodiments, a separate Entities helper table may be created for the model generation set and for the model testing set, or a single Entities helper table may be created that stores the entities from the records of both data sets. The Entities helper tables are stored in the helper table data store 104. An example Entities helper table is illustrated below in Table 4, and an example Records helper table is illustrated below in Table 5.

TABLE 4

An Entities helper table for three example records.
Entities Helper Table

| Entity ID | Entity | Entity Type | Attribute(s) |
| --- | --- | --- | --- |
| 253157 | Charlotte Pediatric Clinic | Facility | Pediatrics |
| 189607 | Shabarek, Nehad, MD | Practitioner | Cardiology |
| 003068 | Turner, Garry, M.D. | Practitioner | Obstetrics and Gynecology, Maternal & Fetal Medicine |

TABLE 5

A Records helper table for four example records.
Records Helper Table

| Record | Event ID | Entity ID | Entity Type | Attribute(s) |
| --- | --- | --- | --- | --- |
| 1 | 2105 | 001056 | Type 1 | A |
| 2 | 6846 | 602451 | Type 1 | C |
| 3 | 9389 | 028431 | Type 2 | A, B |
| 4 | 2077 | 345704 | Type 3 | B |

As illustrated in Table 5 above, the Records helper table includes information gathered from four example records. Each record includes information of at least one occurrence. In Table 5, for each record, the helper table includes an Event ID, an Entity ID, an Entity Type, and corresponding Attributes. The Entity ID and the Event ID are integers that serve as keys to the respective Entities helper table and the Events helper table. A record may include more than one attribute. For example, a medical claim details that a provider (i.e., entity) performed a skin graft procedure (i.e., event), and the provider is a private practitioner (i.e., entity type) that has a specialty of dermatology (i.e., attribute). A Records helper table may store different information than is shown in Table 3. In some embodiments, the Records helper table may store information from the records in raw form rather than with identifiers (e.g., Event ID, Entity ID, etc.).

A Synthesis Categories helper table serves as a reference table that groups information according to an entity type and any corresponding attributes found in the records of each data set. In the embodiment of FIG. 1, the data preparation module 106 determines various possible combinations of entity types and attributes (i.e., all possible synthesis categories, or synthesis categories having a minimum number of occurrences in the events). To determine these combinations, the data preparation module 106 may analyze the records of each data set or may analyze the information in the Records helper table. The data preparation module 106 creates a Synthesis Categories helper table that stores each determined combination of entity type and attribute(s) that is present in the records as a synthesis category (again subject to any minimum threshold requirement). Example SQL pseudocode that represents one way to create the Synthesis Categories helper table is below:

```
synthesis_categories (TABLE)
SELECT
    ROW_NUMBER( )OVER (ORDER BY COUNT(*)) AS id,
    entity_type,
    attributes
FROM (
    SELECT
    e. entity_type,
    ARRAY_AGG(DISTINCT ea.attribute) AS attributes
```

```
    FROM entities AS e
    INNER JOIN entity_attributes AS ea
        ON ea.entity_id=e.id
    GROUP BY entity_id, entity_type)t
GROUP BY entity_type, attributes
HAVING COUNT(*)>=50;
```
As represented by the example pseudocode above, the data preparation module 106 analyzes the data to determine the different entity types, corresponding attributes, and a respective count of each combination of entity type and one or more attributes. In the above example, the minimum threshold requirement for each combination of entity type and attribute is 50, but the number may vary in other embodiments. Increasing the threshold may create fewer synthesis categories, which may result in the system 100 being able to make fewer rules and, thus, fewer predictions. Decreasing the threshold may create a greater number of synthesis categories. In addition, decreasing the threshold may result in each synthesis category not having a sufficient volume of records to create rules from. This may create "noisier" rules, wherein outlier records may be able to dominate the behavior of the predictor rule results. Once the Synthesis Categories helper table is created, the data preparation module 106 associates each synthesis category with a synthesis category identifier that may be used as a foreign key by the genetic algorithm module 108. By combining entity type and corresponding attributes into a synthesis category, this allows the data preparation module to categorize an event and an entity of each record in terms of its corresponding synthesis category. This configuration allows the genetic algorithm module 108 to split execution across several synthesis categories such that each sub-cycle in the genetic algorithm is able to generate generations of predictor rules that pertain to a single synthesis category and that the genetic algorithm may perform several sub-cycles, each for a different synthesis category. In some embodiments, a separate Synthesis Categories helper table may be created for the model generation set and for the model testing set, or a single Synthesis Categories helper table may be created that stores the determined synthesis categories of both data sets. In some embodiments, the Synthesis Categories helper table may include a category that denotes the data set to which the record belongs to allow the genetic algorithm to differentiate records from different data sets. The Synthesis Categories helper tables may be stored in the helper table data store 104.

TABLE 6

A Synthesis categories Helper Table that combines entity type and attribute(s).
Synthesis Categories Helper Table

| Entity Type | Attribute(s) | Synthesis Category | Synthesis Category ID |
|---|---|---|---|
| Type 1 | A | Type 1, Attribute A | 1 |
| Type 1 | C | Type 1, Attribute C | 2 |
| Type 2 | A, B | Type 2, Attributes A, B | 3 |
| Type 3 | B | Type 3, Attribute B | 4 |

As illustrated in Table 6, the Synthesis Categories Helper Table groups the entity type and corresponding attribute(s) found in the records. While the above table illustrates this concept in a general manner, a practical example could relate to medical records or claims. For example, a provider (i.e., entity) of type clinic (i.e., entity type) may have a specialty of family medicine and internal medicine (i.e., a first attribute and a second attribute). The Synthesis Category would be <Clinic, Family Medicine, Internal Medicine> and may have Synthesis Category ID 3. A Synthesis Categories helper table may store different information than is shown in Table 6.

A Categorized Events helper table serves as a reference table that stores pre-computed information regarding whether or not an event in a record is a target event. As previously described, a single cycle of the genetic algorithm yields a set of predictor rules for a single target event. To prepare the data for the genetic algorithm module 108 in such a way that is tailored for each cycle, the data preparation module 106 analyzes the information of the records of both data sets in view of the designated target event for a cycle. In some embodiments, the Categorized Events helper table and Categorized Entities helper table may be created in a different order such that the data of one helper table may be used to synthesize information for the other helper table. Alternatively, the data preparation module 106 may reference the records to synthesize information for the helper tables. In the embodiment of FIG. 1, the data preparation module 106 creates a separate Categorized Events helper table for the model generation set and a Categorized Events helper table for the model testing set. Example SQL pseudocode that represents one way to create the Categorized Events helper table is below:

```
categorized events (TABLE)
SELECT
    synthesis_category_id,
    entity_id,
    event_id,
    COUNT(*) AS total_count,
    COUNT(*) FILTER (WHERE is_valid) AS valid_count
FROM records
    INNER JOIN categorized_entities
    USING (entity_id)
GROUP BY synthesis_category_id, entity_id, event_id
HAVING COUNT(*) FILTER (WHERE is_valid)>0;
candidate_categorized_events (TABLE)
SELECT
    synthesis_category_id,
    entity_id,
    event_id,
    cp.total_count,
    cp.valid_count
FROM categorized_events cp
    INNER JOIN candidate_categorized_entities
    USING (synthesis_category_id, entity_id)
marked events (TABLE)
With no target synthesis category, against full events dataset
SELECT
    synthesis_category_id,
    entity_id,
    event_id,
    event_id=target event_id AS is_target
FROM categorized_events
With no target synthesis category, against the candidate events dataset
SELECT
    synthesis_category_id,
    entity_id,
    event_id,
    event_id=target event_id AS is_target
FROM candidate_categorized_events
With target synthesis category, against full events dataset
SELECT
    synthesis_category_id,
    entity_id,
    event_id,
    event_id=target event_id AS is_target
```

FROM categorized_events
WHERE synthesis_category_id=target synthesis_category_id
With target synthesis category, against the candidate events dataset
SELECT
   synthesis_category_id,
   entity_id,
   event_id,
   event_id=target event_id AS is_target
FROM candidate_categorized_events
WHERE synthesis_category_id=target synthesis_category_id As represented by the example pseudocode above, for a given synthesis category, entity, and event, the data preparation module 106 analyzes the records to determine if the given event is a target event. Each Categorized Events helper table stores the entity identifier, event identifier, and corresponding synthesis category identifier for each record of the data set. For each record, the Categorized Events helper table additionally stores a flag or code value that indicates if the event from the record is the designated target event for the current cycle of the genetic algorithm. As each Categorized Events helper table is tailored for a designated target event, a Categorized Events helper table is created for each cycle of the genetic algorithm for each data set, resulting in two Categorized Events helper tables for each cycle. The same Categorized Events helper table may be used for each sub-cycle of a single cycle. In some embodiments, all of the Categorized Events helper tables for the genetic algorithm may be created once the target events have been determined and before the genetic algorithm is initiated, or a Categorized Events helper table may be created before its respective cycle of the genetic algorithm. By pre-computing this information and storing the information in a Categorized Events helper table, this prevents the genetic algorithm module 108 from having to refer back to the raw data of the model generation set or the model testing set and allows for more efficient computing. The Categorized Events helper tables may be stored in the helper table data store 104.

TABLE 7

A Categorized Events Helper Table for a target event having an event identifier of 9389.
Categorized Events Helper Table
(Target Event = 9389)

| Record | Synthesis Category ID | Entity ID | Event ID | Is Target |
|---|---|---|---|---|
| 1 | 67 | 001056 | 2105 | FALSE |
| 2 | 138 | 602451 | 6846 | FALSE |
| 3 | 67 | 028431 | 9389 | TRUE |
| 4 | 373 | 345704 | 2077 | FALSE |
| 5 | 67 | 001056 | 9389 | TRUE |
| 6 | 67 | 028431 | 2612 | FALSE |

As illustrated in Table 7 above, the Categorized Events helper table includes information gathered from four example records. In Table 7, for each record, the helper table includes a Synthesis Category ID, an Entity ID, an Event ID, and an Is Target field. The Synthesis Category ID, the Entity ID, and the Event ID are values that serve as keys to the respective Synthesis Categories helper table, the Entities helper table, and the Events helper table. The Is Target field is a Boolean value that indicates whether or not the Event ID associated with the record is the designated target event. For example, the helper table above is specific to Target Event 9389; thus, for Record 3 having Event ID 9389, the associated Is Target value equals TRUE. As a result, during the genetic algorithm cycle to generate target rules for predicting future occurrences of Target Event 9389, record 3 of this table would be used, but records 1, 2 and 4 would be skipped. In this configuration, a Categorized Events helper table is created for each cycle of the genetic algorithm having a different target event. Table 7 above may be showing information from records from either the model generation set or the model testing set. As previously described, a separate Categorized Events helper table is created for each data set for each target event. A Categorized Events helper table may store different information than is shown in Table 7.

A Categorized Entities helper table serves as a reference table that stores pre-computed information regarding whether or not an entity having a synthesis category is associated with any record including a target event. Similar to the Categorized Events helper table, the data preparation module 106 creates a separate Categorized Entities helper table for the model generation set and a Categorized Entities helper table for the model testing set. Example SQL pseudocode that represents one way to create the Categorized Entities helper table is below:

entities with category info (VIEW)
SELECT
   entity_id,
   entity_type,
   ARRAY_AGG(DISTINCT attribute) AS attributes
FROM entities_with_attributes
GROUP BY entity_id, entity_type
categorized entities (VIEW)
SELECT
   sc.id AS synthesis_category_id,
   entity_id
FROM entities_with_category_info
   INNER JOIN synthesis_categories sc
   USING (entity_type, attributes);
categorized entities with stats (VIEW)
SELECT
   synthesis_category_id,
   entity_id,
   COUNT(*) AS event_count,
   SUM(total count) AS total_count,
   SUM(valid count) AS valid_count
FROM categorized_events
GROUP BY synthesis_category_id, entity_id;
categories with thresholds (VIEW)
SELECT
   synthesis_category_id,
   COALESCE(MAX(event_count) FILTER (WHERE event_count_quartile<2), 0) AS event_count_threshold,
   COALESCE(MAX(total_count) FILTER (WHERE total_count_quartile<2), 0) AS total_count_threshold,
   COALESCE(MAX(valid count) FILTER (WHERE valid count_quartile<2), 0) AS valid_count_threshold
FROM (
   SELECT
   *,
   NTILE(4) OVER (PARTITION BY synthesis_category_id ORDER BY event_count) AS event_count_quartile,
   NTILE(4) OVER (PARTITION BY synthesis_category_id ORDER BY total_count) AS total_count_quartile,

```
NTILE(4) OVER (PARTITION BY synthesis_catego-
    ry_id     ORDER     BY     valid_count)     AS
    valid_count_quartile
  FROM categorized_entities_with_stats) t
GROUP BY synthesis_category_id
HAVING COUNT(*)>=50;
candidate categorized entities (VIEW)
SELECT
  synthesis_category_id,
  entity_id,
  event_count,
  total_count,
  valid_count
FROM categories_with_thresholds
  INNER JOIN categorized_entities_with_stats
  USING (synthesis_category_id)
WHERE event_count>=event_count_threshold
  AND total_count>=total_count_threshold
  AND valid_count>=valid_count_threshold;
marked entities (TABLE)
SELECT
  synthesis_category_id,
  entity_id,
  BOOL_OR(is_target) AS has_target
FROM marked_events
GROUP BY synthesis_category_id, entity_id;
```

As represented by the example pseudocode above, the data preparation module 106 analyzes the data to determine whether or not there are any records for an entity having a synthesis category that include a target event. In the embodiment of FIG. 1, the data preparation module 106 analyzes the records of both data sets in view of the designated target event for a cycle. The data preparation module 106 may use a respective Categorized Events helper table to avoid referring back to the raw data of each data set. Each Categorized Entities helper table stores an entity identifier and the corresponding synthesis category identifier. For each entity, the Categorized Entities helper table additionally stores a value that indicates if an entity having a synthesis category is associated with any record including the target event. As each Categorized Entities helper table is tailored for a designated target event, a Categorized Entities helper table is created for each cycle of the genetic algorithm for each data set, resulting in two Categorized Entities helper tables (one for the model generation set and one for the model testing set) for each cycle. The same Categorized Events helper table may be used for each sub-cycle of a cycle of the genetic algorithm. In some embodiments, all of the Categorized Entities helper tables for the genetic algorithm may be created once the target events have been determined and before the genetic algorithm is initiated, or a Categorized Entities helper table may be created before its respective cycle of the genetic algorithm. By pre-computing this information and storing the information in a Categorized Entities helper table, this prevents the genetic algorithm module 108 from having to refer back to the raw data of the model generation set or the model testing set and allows for more efficient computing. The Categorized Entities helper tables may be stored in the helper table data store 104.

TABLE 8

A Categorized Entities helper table for a target event having an event identifier of 9389.
Categorized Entities Helper Table
(Target Event = 9389)

| Synthesis Category ID | Entity ID | Has Target |
|---|---|---|
| 67 | 001056 | FALSE |
| 138 | 602451 | FALSE |
| 67 | 028431 | TRUE |
| 373 | 345704 | FALSE |

As illustrated in Table 8 above, the Categorized Entities helper table includes information gathered from four example records. In Table 8, the helper table includes a Synthesis Category ID, an Entity ID, and a Has Target field. The Synthesis Category ID and the Entity ID are integers that serve as keys to the respective Synthesis Categories helper table and the Entities helper table. The Has Target field is a Boolean value that indicates whether or not the entity having the synthesis category has at least one record (of the respective data set) including the designated target event. For example, the Categorized Entities helper table above flows from the Categorized Events helper table (Table 7) in the previous example. As such, Table 8 is also specific to Target Event 9389. Based on the information from Table 7, it is clear that Record #3 has a Synthesis Category ID 67 and an Event ID 9389 and, thus, matches the target event. Therefore, as shown in Table 8, Synthesis Category ID 67 is associated with a Has Target value TRUE to indicate that the entity is associated with a record including the target event. However, a second entity having the same synthesis category 67 is not associated with any records including the target event and, thus, the Has Target value is FALSE. In this configuration, a Categorized Entities helper table is created for each cycle of the genetic algorithm having a different target event. Table 8 above may be showing information from records from either the model generation set or the model testing set. As previously described, a separate Categorized Entities helper table is created for each data set for each target event. Rather than referring back to the Categorized Events helper table, or back to the raw data of the data sets, and parsing through the information, the association between a synthesis category and a target event is readily available in the Categorized Entities helper table. A Categorized Entities helper table may store different information than is shown in Table 8.

The genetic algorithm module 108 performs the genetic algorithm processing to iteratively construct generations of genes (i.e., predictor rules) until a final generation of genes is constructed which meets a termination condition. The genetic algorithm module 108 uses as its input data the data synthesized by the data preparation module 106 and searches for an optimal set of genes that satisfies a number of objectives when applied to the model testing data set. In the embodiment of FIG. 1, the genetic algorithm module 108 includes an initialization module 112, an evaluation module 114, a recombination module 116, and a paring module 118.

The initialization module 112 creates the initial generation of genes for each sub-cycle of each cycle of the genetic algorithm. As previously described, each gene (i.e., predictor rule) is a logical expression that represents whether or not an entity (having a certain combination of entity type and attributes, i.e., a synthesis category) associated with one or more events is a predictor for the entity being associated with a target event (which may be the same or different from the prior events found in the records). To create the initial generation of genes from the model generation set for a sub-cycle, the initialization module 112 iterates through the Categorized Events helper table (for the model generation set) for the designated target event for the cycle of the genetic algorithm. The initialization module 112 searches the Categorized Events helper table for records having a combination of the designated target event and the designated synthesis category for the sub-cycle. Example SQL pseudocode that represents one way create an initial population of predictor rules is below:

```
SELECT
   event_id,
   predictor_rank,
   coincident_count,
   pct_coincident
FROM (
   SELECT
   event_id,
   ROW_NUMBER( )OVER (ORDER BY pct_coincident
      DESC) AS predictor_rank,
   coincident_count,
   pct_coincident
   FROM (
   SELECT
      event_id,
      COUNT(*) FILTER (WHERE has_target) AS coincident_count,
      (COUNT(*) FILTER (WHERE has_target)::NUMERIC)/COUNT(*) AS pct_coincident
   FROM (
      SELECT
         event_id
      FROM marked_entities
         INNER JOIN marked_events
         USING (entity_id)
         WHERE has_target
         AND NOT is_target
         GROUP BY event_id
         HAVING COUNT(*)>=50) t
      INNER JOIN marked_events
         USING (event_id)
      INNER JOIN marked_entities
         USING (entity_id)
      GROUP BY event_id) u)v
   WHERE (pct_coincident>=0.75
      OR predictor_rank<=10)
      AND pct_coincident>=0.50
ORDER BY predictor_rank;
```

As represented by the example pseudocode above, the initialization module 112 searches for records having a combination of the designated target event and the designated synthesis category for the sub-cycle.

As each row of the Categorized Events helper table is coded to whether the event is the target identifier, the initialization module 112 may query for a TRUE value in the Is Target field. Alternatively, the initialization module 112 may query using the event identifier for the target event. Once the initialization module 112 finds a record having the designated synthesis category and the designated target event, the initialization module 112 determines the entity associated with each record. The initialization module 112 then identifies all other records in the Categorized Events helper table that are associated with that entity to identify other events associated with that entity that may serve as predictors for the target event (i.e., a candidate predictor event). For each such identified candidate predictor event, the initialization module 112 tabulates each instance of a record having the combination of the designated synthesis category and the candidate predictor event in the Categorized Events helper table to obtain the total number of instances of the combination. If the total number of instances of a combination of a synthesis category and a candidate predictor event is above a certain minimum threshold, then the candidate predictor event is considered for evaluation as a predictor event of target event. The use of the threshold for a minimum number of instances beneficially ensures a sufficient number of occurrences of events and avoids generating very narrow rules with limited applicability. Accordingly, the initialization module 112 creates a predictor rule based on the combination. In the embodiment of FIG. 1, a predictor rule is a Boolean expression in the following general format:

For <Target Event i>: <Synthesis Category j><Predictor Event k>.

As a Boolean expression, a predictor rule will result in either TRUE or FALSE when applied to model testing data set. A TRUE result indicates that the combination of Synthesis Category j and Predictor Event k is a predictor that Synthesis Category j is also associated with the Target Event i, meaning that there was at least one (or other threshold number) of records in the model testing set that had synthesis category j and predictor event k. In other words, the predictor rule accurately predicted the existence of the target event for the synthesis category in the model testing data set. A FALSE result occurs when there is no instance (or less than the threshold number of instances) of records in the model testing data set that have the combination of Synthesis Category j and Predictor Event k. In other words, the predictor rule predicted a relationship which did not in fact appear in the model testing data set. In the embodiment of FIG. 1, a predictor rule of an initial generation of a sub-cycle begins with a single Predictor Event k. However, due to recombination of predictor rules to produce subsequent generations in a sub-cycle, predictor rules may include a combination of several predictor events to predict a single target event.

As an example, referring again to Table 7, the Categorized Events helper table shown is for a target event having an event identifier of 9389.

TABLE 7

A Categorized Events Helper Table for a target event having an event identifier of 9389.
Categorized Events Helper Table
(Target Event = 9389)

| Record | Synthesis Category ID | Entity ID | Event ID | Is Target |
|---|---|---|---|---|
| 1 | 67 | 001056 | 2105 | FALSE |
| 2 | 138 | 602451 | 6846 | FALSE |
| 3 | 67 | 028431 | 9389 | TRUE |
| 4 | 373 | 345704 | 2077 | FALSE |
| 5 | 67 | 001056 | 9389 | TRUE |
| 6 | 67 | 028431 | 2612 | FALSE |

To create the initial generation of predictor rules for a sub-cycle of the genetic algorithm's cycle, the initialization module 112 may query the Categorized Events helper table for a TRUE value in the Is Target data field along with the synthesis category of the sub-cycle. This query may be understood as a search for all Synthesis Categories for which there was the minimum number of occurrences of Target Event 9389 in the model generation data. For the sake of this example, the designated target event is Target Event 9389 and the designated synthesis category is Synthesis Category 67. As illustrated in Table 7, the query would yield Record 3 as having Target Event 9389 and Synthesis Category 67. The initialization module 112 would identify the associated entity as Entity 028431 and would then determine any other records in this helper table that also have Entity 028431. As shown in Table 7, Record 6 has Entity 028431, Synthesis Category 67, and Event 2612. While only six records are shown in Table 7 for sake of example only, in practice there may be numerous instances of various combinations of a given synthesis category and event and of other combinations of the same synthesis category and other candidate predictor events in the Categorized Events Helper Table of the model generation set. The initialization module 112 tabulates the number of instances of the Synthesis Category 67 associated with Event 2612 and associated with all other candidate predictor events. For each combination of synthesis category and candidate predictor event, the combinations having a number of instances above a threshold are used to create a predictor rule. Assume for the sake of example that there are 10 instances of records with Synthesis Category 67 and Event 2612, which is above a designated threshold. Continuing with the example, a resulting predictor rule may be as follows:

For <Target Event 9389>: <Synthesis Category 67><Predictor Event 2612>.

In this example, the Synthesis Category 67 occurring with Predictor Event 2612 is used as a predictor for predicting that the Synthesis Category 67 is also associated with Target Event 9389. The initialization module 112 repeats this process for other candidate predictor events that the designated synthesis category is associated with, as determined through the target event's Categorized Events helper table. As a result, an initial generation of predictor rules for a sub-cycle is created, wherein the predictor rules include a variety of combinations of the designated synthesis category with one or more predictor events for predicting a target event. In the embodiment of FIG. 1, the initialization module 112 stores each predictor rule in the predictor rule data store 110 after each predictor rule is created. Additionally, each predictor rule may be associated with a rule identifier, which may be stored in a Rules helper table to allow for more efficient computing by the genetic algorithm module 108.

The initialization module 112 performs this process for each sub-cycle of each cycle of the genetic algorithm, wherein each sub-cycle has a different designated synthesis category and each cycle has a different designated target event. Example SQL pseudocode that represents one way the initialization module 112 can create initial populations of predictor rules for each sub-cycle having a different synthesis category is below:
viable_categories (TABLE)
SELECT
  sc.*
FROM (
  SELECT
  synthesis_category_id,
  COUNT(*)
  FROM candidate_categorized_events
  WHERE event_id=target_event_id
  GROUP BY synthesis_category_id, event_id
  HAVING COUNT(*)>=min event_count_threshold)t
  INNER JOIN candidate_synthesis_categories sc
  ON sc.id=t.synthesis_category_id
ORDER BY count DESC;
Initialization module pseudocode
initialize an empty overall set of predictor rules
for each viable synthesis category:
  find initial predictor rules
  if no initial predictor rules could be found:
    move to the next synthesis category
  create marked tables for the given synthesis category
As represented by the example pseudocode above, the initialization module 112 determines if all target events have been evaluated for a synthesis category (i.e., a sub-cycle is complete), and if so, the initialization module 112 begins the next sub-cycle for a different synthesis category.

The evaluation module 114 evaluates each of the predictor rules in a given generation to determine which rules will be used for generating further predictor rules by recombination. Once the initial population for a sub-cycle has been created by the initialization module 112, the genetic algorithm iteratively constructs additional generations of predictor rules, until a termination condition is reached. In the embodiment of FIG. 1, the evaluation module 114 evaluates each predictor rule of a generation by performing a search query on the model testing data to obtain a set of entities associated with a synthesis category and then applying the predictor rule as a Boolean expression to the obtained set of entities. By creating the predictor rules with a first set of data and applying the predictor rules to a second set of data, the genetic algorithm module 108 is able to determine how well predictor rules are able to predict target events. Predictor rules that satisfy defined criteria (as further described below) are used for creating a next generation of rules. Example SQL pseudocode that represents one way to evaluate a generation of predictor rules is below:
SELECT
  synthesis_category_id,
  entity_id,
  rule_id,
  BOOL_AND(has_detector_group) AS has_predictor
FROM (
  SELECT
  rule_id,
  synthesis_category_id,
  entity_id,
  clause_id,
  BOOL_OR(event_id=ANY(detector_ids)
  FROM marked_events
  INNER JOIN serialized_rules
    USING (synthesis_category_id)
  GROUP BY rule_id, synthesis_category_id, entity_id, clause_id)
GROUP BY synthesis_category_id, entity_id, rule_id
As represented by the example pseudocode above, the evaluation module 114 identifies a predictor rule, an associated synthesis category, and an entity to evaluate if the entity associated with the synthesis category of the predictor rule has records including the event associated with the predictor rule. In the example pseudocode above, the evaluation module 114 simultaneously evaluates the predictor rules and creates an Entities with Rules helper table, discussed in further detail below.

The evaluation module 114 applies each predictor rule of a generation as a search query to the model testing set. As previously described, a predictor rule is a Boolean expression in the following general format:

For <Target Event i>: <Synthesis Category j><Predictor Event k>.

As a Boolean expression, a predictor rule will result in either TRUE or FALSE when evaluated with the model testing data. In the embodiment of FIG. 1, the evaluation module 114 searches the Categorized Events helper table of the model testing data for records having the Synthesis Category j. The evaluation module 114 identifies one or more entities associated with the Synthesis Category j (i.e., a record includes an entity having the synthesis category). The evaluation module 114 then evaluates the records for each identified entity in the Categorized Events helper table to determine if the entity has a record including the Predictor Event k. If an entity having Synthesis Category j has a record having Predictor Event k, the predictor rule returns TRUE, and if not, the predictor rule returns FALSE. In this embodiment, a predictor rule requires only a minimum of one record in the Categorized Events helper table having the Predictor Event k to return TRUE. As previously described, later generations of predictor rules may include a combination of predictor events used to predict a target event, rather than a single Predictor Event k. For these predictor rules, the evaluation module 114 determines if the entity having the Synthesis Category j has records including the combination of predictor events. By searching the Categorized Events helper table, the evaluation module 114 is able to determine against the records of the model testing data whether or not an entity having a synthesis category is associated with predictor events that satisfy a predictor rule. In the embodiment of FIG. 1, the evaluation module 114 creates an Entities with Rules helper table to store the result of each predictor rule applied to the model testing data.

An Entities with Rules helper table serves as a reference table that stores pre-computed information regarding whether or not a rule applies to an entity having a synthesis category. In the embodiment of FIG. 1, the Entities with Rules helper table stores the result of predictor rules applied to the model testing data, which aids the genetic algorithm module 108 in determining the quality of the predictor rule created using the model generation data. Each Entities with Rules helper table stores the synthesis category identifier, entity identifier, rule identifier, and the corresponding result of the predictor rule. Similar to the Categorized Events and Categorized Entities helper tables, each Entities with Rules helper table is tailored for a designated target event. Accordingly, an Entities with Rules helper table is created for each cycle of the genetic algorithm. By pre-computing this information and storing the information in the Entities with Rules helper table, the genetic algorithm module 108 is able to determine a fitness level of each predictor rule, which will be discussed in greater detail.

TABLE 8

An Entities with Rules Helper Table for a target event having an event identifier of 9389.
Entities with Rules Helper Table
(Target Event = 9389)

| Synthesis Category ID | Entity ID | Rule ID | Has Predictor |
|---|---|---|---|
| 67 | 001056 | 862 | TRUE |
| 67 | 602451 | 862 | TRUE |
| 67 | 028431 | 862 | FALSE |
| 67 | 345704 | 499 | TRUE |

As illustrated in Table 8 above, the Entities with Rules table includes the results of predictor rules applied to model testing data. In Table 8, the helper table includes Synthesis Category ID, an Entity ID, a Rule ID, and a Has Predictor field. The Synthesis Category ID, the Entity ID, and the Rule ID are integers that serve as keys to the respective Synthesis Categories helper table, the Entities helper table, and the Rule helper table. The Has Predictor field is a Boolean value that indicates whether or not an entity having a synthesis category also has records including predictor events that satisfy the rule (i.e., the rule is satisfied if at least one record in the model testing data set is associated with the synthesis category of the rule and has the predictor event of the rule). While the entity identifier need not be used to evaluate a predictor rule, storing the entity identifier allows the evaluation module 114 to later determine a fitness level of a predictor rule. An Entities with Rules helper table may store different information than is shown in Table 8.

As shown in Table 8, the Entities with Rules helper table is specific to Target Event 9389. As such, the two different predictor rules that are applied to the model testing data are both for a target event having an identifier 9389. While Table 8 is a continuation of the examples above, note that the entity identifiers associated with the synthesis category identifiers may change since the Entities with Rules helper table presents information from the model testing data. Returning to the example predictor rule from before that was created using the model generation data:

For <Target Event 9389>: <Synthesis Category 67><Predictor Event 2105>, the evaluation module 114 evaluates whether or not Synthesis Category 67 being associated with Predictor Event 2105 may be a predictor for Synthesis Category 67 also being associated with Target Event 9389 when evaluated against the model testing data. In this example, this rule has an identifier 862. The evaluation module 114 searches the Categorized Events helper table specific to the Target Event 9389 of the model testing data for any record having a Synthesis Category 67. Of the two records having Synthesis Category 67 (Records 1 and 3), the evaluation module 114 identifies the entity associated with the each record (Entity 001056 and 028431, respectively). The evaluation module 114 then parses through the records in the Categorized Events helper table for each identified entity to determine if any of those records has a Predictor Event 2105. As shown in Table 8, Record 1 for Entity 001056 has Predictor Event 2105, while Record 3 for Entity 028431 does not have a record having Predictor Event 2105. Thus, as shown in Table 8, the Entities with Rules helper table shows the Has Predictor value as TRUE for Entity 001056 and as FALSE for Entity 028431. This indicates that when Rule 862 is applied, the Synthesis Category 67 is associated with some entities having records in the model testing data set having Predictor Event 2105 and not with others. The numbers of records with and without such associations is used to evaluate the predictor rule as further described below.

In addition to applying predictor rules to the model testing data, the evaluation module 114 evaluates the results of the predictor rules to determine a fitness level of each predictor rule. In the embodiment of FIG. 1, the evaluation module uses two fitness functions, precision and recall. The precision measure determines how well a predictor rule is able to retrieve only relevant results. In the embodiment of FIG. 1, the precision measure is the percent of all results of the model testing set returned by a predictor rule that are truly relevant, wherein a relevant result means that the entity has the synthesis category of the predictor rule, has a record with the predictor event(s) of the predictor rule, and has a record with the target event of the predictor rule. For example, if a predictor rule returns ten results of which only four results are relevant, then the predictor rule has a precision measure of 4 out of 10, or 40%. The recall measure determines how well a predictor rule is able to retrieve all of the relevant results in the model testing set. In the embodiment of FIG. 1, the recall measure is the percent of all relevant results that are returned from the model testing set. For example, if a predictor rule returns ten results of which only four results are truly relevant, and there were eight actual relevant results in the model testing set, then the predictor rule has a recall measure of 4 out of 8, or 50%. Each predictor rule of a generation receives a precision measure and a recall measure.

To determine a precision measure and a recall measure for a predictor rule, the evaluation module 114 evaluates the results of each predictor rule to determine the number of true positives, true negatives, false positives, and false negatives. A true positive and a true negative indicate an accurate prediction by a predictor rule for an entity, while a false positive and a false negative indicate an inaccurate prediction by a predictor rule for an entity. In the embodiment of FIG. 1, to determine these numbers, the evaluation module 114 uses the Categorized Entities and Entities with Rules helper tables of the model testing set for the target event. The evaluation module 114 may join the helper tables using the synthesis category identifier and entity identifier columns to create an intermediate helper table. The joined helper table includes the Synthesis Category ID, Entity ID, Rule ID, Has Target value, and the corresponding Has Predictor result of the predictor rule. The joined helper table allows the evaluation module 114 to efficiently compute the number of true positives, true negatives, false positives, and false negatives for a single predictor rule. Example SQL pseudocode that represents one way to create the joined helper table is below:

SELECT
   synthesis_category_id,
   Rule_id,
   COUNT(DISTINCT entity_id) AS total_count,
   COUNT(DISTINCT entity_id) FILTER (WHERE has_target) AS actual_positive_count,
   COUNT(DISTINCT entity_id) FILTER (WHERE has_detector AND has_target) AS true_positive_count,
   COUNT(DISTINCT entity_id) FILTER (WHERE has_detector=has_target) AS true_count,
   COUNT(DISTINCT entity_id) FILTER (WHERE has_detector) AS positive_count
FROM (
   SELECT
   synthesis_category_id,
   entity_id,
   rule_id,
   has_detector
   FROM entities_with_rules)t
   INNER JOIN marked_entities
   USING (synthesis_category_id, entity_id)
GROUP BY synthesis_category_id, rule_id As represented by the example pseudocode above, the evaluation module 114 calculates an actual positive count, a true positive count, a true count, and a positive count for a selected synthesis category and predictor rule, which will be discussed in further detail below. These counts may be calculated from the separate Categorized Entities and Entities with Rules helper tables. Preferably, the evaluation module 114 may additionally create the joined helper table to streamline the information from the Categorized Entities and Entities with Rules helper tables for further analysis.

TABLE 9

A Joined helper table to determine true and false negatives and positives.
Joined Helper Table
(Target Event = 9389)

| Synthesis Category ID | Entity ID | Rule ID | Has Target | Has Predictor | Evaluation |
|---|---|---|---|---|---|
| 643 | 876538 | 236 | TRUE | TRUE | True Positive |
| 643 | 900743 | 236 | FALSE | FALSE | True Negative |
| 643 | 334855 | 236 | FALSE | TRUE | False Positive |
| 643 | 468369 | 236 | TRUE | FALSE | False Negative |
| 643 | 887732 | 236 | FALSE | TRUE | False Positive |
| 643 | 918347 | 236 | TRUE | TRUE | True Positive |

By creating a joined helper table, the evaluation module 114 is able to efficiently examine each entity having a synthesis category and the corresponding Has Target and Has Predictor values. In the embodiment of FIG. 1, a true positive indicates that 1) at least one record in the model testing data set for an entity having a synthesis category includes the target event and that 2) a predictor rule is satisfied by at least one record in the model testing data set for the entity as including the predictor event(s) of the predictor rule; therefore, a true positive indicates that the predictor rule accurately determined that the predictor event(s) of the predictor rule are a predictor for the target event for the entity having the synthesis category of the predictor rule. As illustrated in Table 9, Entities 876538 and 918347 are classified as true positives, wherein Has Target is TRUE and Has Predictor is TRUE for each entity. A joined helper table may store different information than is shown in Table 9.

On the other hand, a true negative indicates that 1) there are not any records in the model testing data set for an entity having a synthesis category that include the target event and that 2) a predictor rule is not satisfied by any records in the model testing data set for the entity as including the predictor event(s) of the predictor rule; therefore, a true negative indicates that the predictor rule accurately determined that the predictor event(s) of the predictor rule are not a predictor for the target event for the entity having the synthesis category of the predictor rule. As illustrated in Table 9, Entity 900743 is classified as a true negative, wherein Has Target is FALSE and Has Predictor is FALSE for that entity.

A false positive indicates that 1) there are not any records in the model testing data set for an entity having a synthesis category that include the target event and that 2) a predictor rule is satisfied by at least one record in the model testing data set for the entity as including the predictor event(s) of the predictor rule; therefore, a false positive indicates that the predictor rule inaccurately determined that the predictor event(s) of the predictor rule are a predictor for the target event for that entity having the synthesis category of the predictor rule. As illustrated in Table 9, Entities 334855 and 887732 are classified as false positives, wherein Has Target is FALSE and Has Predictor is TRUE for each entity.

A false negative indicates that 1) at least one record in the model testing data set for an entity having a synthesis category includes the target event and that 2) a predictor rule is not satisfied by any records in the model testing data set for the entity as including the predictor event(s) of the predictor rule; therefore, a false negative indicates that the predictor rule inaccurately determined that the predictor event(s) of the predictor rule are not a predictor for the target event for that entity having the synthesis category of the predictor rule. As illustrated in Table 9, Entity 468369 is classified as a false negative, wherein Has Target is TRUE and Has Predictor is FALSE for that entity. Using the entity identifier, the evaluation module 114 is able to compute the number of true positives, true negatives, false positives, and false negatives for the predictor rule.

To calculate the precision and recall measures for each predictor rule, the evaluation module 114 uses the following formulas:

(1) Precision=(True Positive Count)/(Positive Count)

(2) Recall=(True Positive Count)/(Actual Positive Count), wherein True Positive Count is the number of instances of Has Target TRUE and Has Predictor TRUE (as described with regards to the Joined helper table, Table 8), Positive Count is the number of instances of Has Predictor TRUE, and Actual Positive Count is the number of instances of Has Target TRUE in a Joined helper table for a predictor rule. The evaluation module 114 calculates the precision and recall measures for each predictor rule in a given generation. In the embodiment of FIG. 1, the evaluation module 114 ranks the predictor rules according to each measure. This configuration results in a first ranking of the predictor rules according to precision and a second ranking of the predictor rules according to recall.

TABLE 10

Example of predictor rules ranked according to precision and recall measures.

| | Precision Ranking | Recall Ranking |
|---|---|---|
| 1 | Rule ID # 67 | Rule ID # 10 |
| 2 | Rule ID # 32 | Rule ID # 45 |
| 3 | Rule ID # 10 | Rule ID # 90 |
| 4 | Rule ID # 89 | Rule ID # 32 |
| 5 | Rule ID # 63 | Rule ID # 87 |

As illustrated in Table 10 above, a predictor rule is ranked relative to the other predictor rules in a generation according to the predictor rule's precision measure and recall measure. As a result, two pools of predictor rules are created. In Table 10, as an example, only the top 5 predictor rules are shown for each pool as an example. In some embodiments, each pool may include every predictor rule of the generation, while in other embodiments, the evaluation module 114 may only rank up to a certain number of predictor rules. In both embodiments, there may be overlap of predictor rules between the pools. For example, Rule ID #32 is ranked second according to its precision measure and is ranked fourth according to its recall measure. The precision ranked and the recall ranked pools are used to create an offspring generation of predictor rules.

The recombination module 116 creates offspring generations of predictor rules through recombination. In the embodiment of FIG. 1, for each sub-cycle, the initial generation of predictor rules for a target event is created by the initialization module 112, while each offspring generation is created by the recombination module 116. The recombination module 116 selects predictor rules from a parent generation based on the rankings of the predictor rules. In the embodiment of FIG. 1, the recombination module 116 selects the top N (e.g. N=10) predictor rules from the precision ranked pool and the top N predictor rules from the recall ranked pool for recombination. In other embodiments, the number of predictor rules selected for recombination may vary. Example SQL pseudocode that represents one way to create offspring generations of predictor rules is below:

new_rules=[ ]
let high_recall_rules be the top 20 rules sorted by recall measure
for all combinations (rule_a, rule_b) of the top 10 high_recall_rules sorted by recall:
    add the union of rule_a and rule_b to the set of new_rules
add all high_recall_rules to the set of new_rules
let high_precision_rules be the top 20 rules sorted by precision measure
for all combinations (rule_a, rule_b) of the top 10 high precision rules sorted by precision:
    add the intersection of rule_a and rule_b to the set of new_rules
add all high_precision_rules to the set of new_rules As represented by the example pseudocode above, the recombination module 116 selects a top number (e.g. N=10) of the predictor rules based on the recall ranking and the precision ranking and then logically combines the selected predictor rules.

In the embodiment of FIG. 1, the top ranked predictor rules from the precision ranked pool are recombined using a logical OR combination. The top ranked predictor rules are paired with each other, and for each unique pair, an offspring predictor rule is created by combining the predictor events from the pair of parent predictor rules. For example, in an embodiment where N=10, the predictor events from the top 10 precision ranked rules are OR combined together by pairs (i.e. the combination function nCr, where n=10 and r=2); this recombination results in 45 offspring predictor rules. As an example, the two following predictor rules from the parent generation may be in the top 10 precision ranked pool and may be paired for recombination:

1) For <Target Event 9389>: <Synthesis Category 67><Predictor Event 2105>

2) For <Target Event 9389>: <Synthesis Category 67><Predictor Event 5641>.

The recombination of these two parent predictor rules would result in the following offspring predictor rule:

For <Target Event 9389>: <Synthesis Category 67><Predictor Event 2105 OR 5641>.

As previously described, a predictor rule will result in either TRUE or FALSE when applied to model testing data set. For the offspring predictor rule, a TRUE result indicates that there is at least one record in the model testing set for an entity having Synthesis Category 67 and Predictor Event 2105 or at least one record for the same entity having Synthesis Category 67 and Predictor Event 5641. A FALSE result indicates that there is not at least one record in the model testing set having either respective predictor event for the same entity having the synthesis category. In some embodiments, the recombination module 116 may simplify a predictor rule down to its simplest logic form to avoid redundancy.

In the embodiment of FIG. 1, in a similar manner, the top N predictor rules from the recall ranked pool are recombined using a logical AND combination. The top N predictor rules from the parent generation are paired with each other, and for each unique pair, an offspring predictor rule is created by combining the predictor events from the pair of parent predictor rules. In an embodiment where N=10, this recombination results in 45 offspring predictor rules. As an example, the two following parent predictor rules may be in the top 10 recall ranked pool and may be paired for recombination:

1) For <Target Event 9389>: <Synthesis Category 67><Predictor Event 2105>

2) For <Target Event 9389>: <Synthesis Category 67><Predictor Event 5641>.

The recombination of these two parent predictor rules would result in the following offspring predictor rule:

For <Target Event 9389>: <Synthesis Category 67><Predictor Event 2105 AND 5641>.

As previously described, a predictor rule will result in either TRUE or FALSE when applied to model testing data set. For the offspring predictor rule, a TRUE result indicates that there is at least one record in the model testing set for an entity having Synthesis Category 67 and Predictor Event 2105 and at least one record for the same entity having Synthesis Category 67 and Predictor Event 5641. A FALSE result indicates that there is not at least one record in the model testing set having each predictor event for the same entity having the synthesis category. In some embodiments, the recombination module 116 may simplify a predictor rule down to its simplest logic form to avoid redundancy.

After a set of offspring predictor rules has been created through AND and OR recombination, the recombination module 116 completes the new generation by carrying over some of the predictor rules from the parent generation. In the embodiment of FIG. 1, the recombination module 116 carries over the top M precision ranked predictor rules and the top M recall ranked predictor rules. The number of predictor rules carried over from the parent generation may vary in other embodiments. The values for N and M may be varied to selectively control system performance and training time.

In addition, once the offspring generation of predictor rules has been determined, the recombination module 116 is configured to determine if a termination criteria of the genetic algorithm module 108 has been met for a sub-cycle. In the event that a termination criteria has been met, the recombination module 116 terminates the creation of offspring generations of predictor rules. Examples of termination criteria may include parent and offspring generations having identical predictor rules, a fitness level of a generation has reached a threshold, the fitness level between parent and offspring generations has not substantially changed, or a fixed number of generations has been created. In the embodiment of FIG. 1, the recombination module 116 is configured to compare an offspring generation of predictor rules to the parent generation of predictor rules to determine if a termination criteria has been met.

After the genetic algorithm module 108 has performed several sub-cycles and several cycles such that a large population of predictor rules are stored in the predictor rule data store 110, wherein the population of predictor rules are for predicting a variety of target events for a variety of synthesis categories using several predictor events, the paring module 118 pares down the population of predictor rules. The paring module 118 aims to cultivate an optimized set of predictor rules that is able to predict a majority of the target events that are associated with a specific synthesis category having predictor events. To do so, the paring module 118 searches the total population of predictor rules and identifies the predictor rules associated with a specific synthesis category. The identified predictor rules may be predictors for different target events. In the embodiment of FIG. 1, the paring module 118 evaluates each predictor rule's contribution and accordingly removes predictor rules that are redundant or overly-fitted. A contribution of a predictor rule is defined as the number of true positive predictions that were made by that predictor rule and not made by any other predictor rules. In other words, a predictor rule may be the only predictor rule that is able to accurately predict the target event for an entity having the synthesis category of the predictor rule. The paring process is done iteratively by removing a predictor rule with the lowest unique contribution and then evaluating the contribution of the remaining predictor rules. The paring module 118 may repeat this process for each synthesis category to determine an optimized set of predictor rules that are able to predict a majority of the target events for each synthesis category. Example SQL pseudocode that represents one way to pare down a population of predictor rules is below:

```
unique_rules=[ ]
candidate_rules=rules
while there are still candidate_rules remaining:
    compute the scores for the candidate_rules
    unique_scores=[ ]
    for each synthesis_category covered by the candidate_rules:
        let the category_scores be the scores for just rules for that synthesis_category
        sort the category_scores first by sole_precision, then descending by positive_count, then descending by rule id
        if the sole_precision of the first category_score is not zero:
            add all category_scores to unique_scores
        else:
            add all but the first category_score to candidate_scores
        if there is at least one unique_score:
            add the rules represented by the unique_scores to new_rules
        set candidate_rules to the rules represented by candidate_scores
current_rules=unique_rules
previous_rollup=1
while there are still current_rules remaining:
    compute the rollup and unique_scores for all of the current_rules
    compute the rollup_score of the current rollup against the previous_rollup
    if (the rollup_score is less than the final score threshold or the rollup_score is greater than 0) and the rollup precision is greater than the final precision threshold:
        Terminate rule pruning
    set retained_rules to be all but the the lowest-performing rule from current_rules from each category, sorting first by sole precision and then by precision.
    previous_rollup=rollup
    previous_rules=current_rules
    current_rules=retained_rules
return the previous_rules, since the current_rules went one step too far.
```

As represented by the example pseudocode above, the paring module 118 calculates a number of statistics for a predictor rule to determine a unique contribution of the predictor rule. Based on the statistics, the paring module 118 removes a predictor rule and then evaluates the remaining predictor rules as a set.

To determine a predictor rule's unique contribution, the paring module 118 calculates a number of statistics of the predictor rule, including actual positive count, true positive count, true count, positive count, sole positive count, and sole true positive count. In the embodiment of FIG. 1, the paring module 118 executes a search query across the joined helper table as described in section [0046] to determine these statistics for each predictor rule. A separate count sub-query is performed for each statistic described here, with different filtering criteria depending upon the count. The actual positive count represents the instances in which Has Target is TRUE for an entity to which the predictor rule was applied. The true positive count represents the instances of true positives, in which the predictor rule accurately determined that an entity had both the predictor event(s) and target event of the predictor rule. The true count represents the instances in which the Has Predictor and the Has Target had the same value (both TRUE or both FALSE). The positive count represents the instances in which Has Predictor is TRUE for an entity to which the predictor rule was applied. The sole true positive count represents the instances in which the predictor rule is the only predictor rule to produce a true positive for a target event. The sole positive count represents the instances in which the predictor rule is the only predictor rule to have Has Predictor equal to TRUE for an entity to which the predictor rule was applied. Using these statistics, the paring module 118 is able to calculate precision, recall, accuracy, sole precision, and percent unique for each predictor rule.

$$Precision = \frac{True\ Positive\ Count}{Positive\ Count}$$

$$Recall = \frac{True\ Positive\ Count}{Actual\ Positive\ Count}$$

$$Accuracy = \frac{True\ Count}{Total\ Count}$$

$$Sole\ Precision = \frac{Sole\ True\ Positive\ Count}{Sole\ Positive\ Count}$$

$$Percent\ Unique = \frac{Sole\ True\ Positive\ Count}{True\ Positive\ Count}$$

These metrics allow the paring module 118 to determine the unique contribution of each predictor rule. The predictor rules are ranked by their unique contribution value. In the case that two or more predictor rules have the same unique contribution, the paring module 118 removes the predictor rule that made the most predictions overall, as the remaining rules will provide the same contribution as the removed predictor rule but will allow for more granular control over the behavior of the set of predictor rules. For example, given the following predictor rules:
1) For <Target Event 9389>: <Synthesis Category 67><Predictor Event 1>
2) For <Target Event 9389>: <Synthesis Category 67><Predictor Event 1 OR 2>, the paring module 118 would remove the first predictor rule because it depends solely upon Predictor Event 1, and the second predictor rule would have a higher unique contribution. Continuing with the example, given a third predictor rule:
3) For <Target Event 9389>: <Synthesis Category 67><Predictor Event 2>, the paring module 118 would remove the second predictor rule because it will have no unique contribution compared to the other two predictor rules, which can provide more granular control over the same predictions as the second predictor rule.

As predictor rules are removed, the cumulative precision of the set of remaining predictor rules may increase but the cumulative recall of the set may decrease. The tradeoff between precision and recall throughout the paring process is generally acceptable, but as more predictor rules are removed, the paring process reaches a point of diminishing returns for the amount of precision gained for the number of predictions lost. After a predictor rule is removed from the set of predictor rules, the paring module 118 determines the overall contribution of the set of remaining predictor rules.

In the embodiment of FIG. 1, the paring module 118 calculates two metrics after a predictor rule is removed: true positive count and precision.

$$T\ True\ Positive\ Count = \frac{True\ Positive\ Count - Previous\ True\ Positive\ Count}{True\ Positive\ Count}$$

$$T\ Precision = \frac{Precision - Previous\ Precision}{Precision}$$

The equation for $T_{True\ Positive\ Count}$ has the behavior that it will be a small negative number when the number of true positive predictions lost per iteration is small in relation to the total number of true positive predictions remaining (when it's acceptable to continue removing predictor rules) and will be a large negative number otherwise (when it's acceptable to stop removing predictor rules). Similarly, $T_{Precision}$ will be a large positive number when it's acceptable to continue removing predictor rules and a small positive number when it's acceptable to stop removing predictor rules. In the embodiment of FIG. 1, the paring module 118 uses the ratio of these two metrics to determine the overall contribution of the set of predictor rules:

$$\frac{T\ True\ Positive\ Count}{T\ Precision} = \frac{(True\ Positive\ Count - Previous\ True\ Positive\ Count) * Precision}{(Precision - Previous\ Precision) * True\ Positive\ Count}$$

Figure 2:
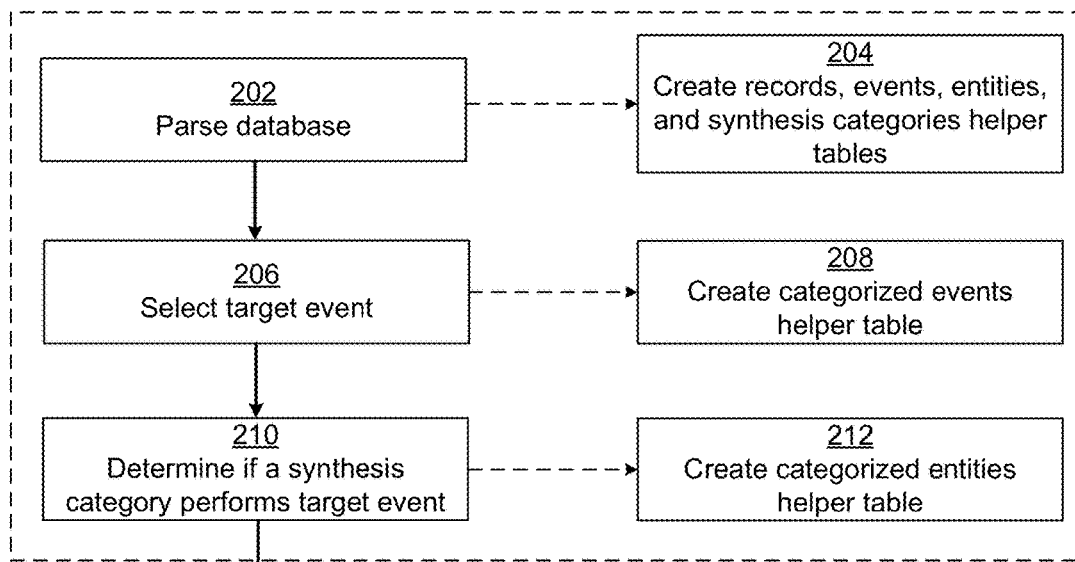
FIG. 2 illustrates a process flow for the genetic algorithm according to an embodiment of the present invention.
Figure 2:
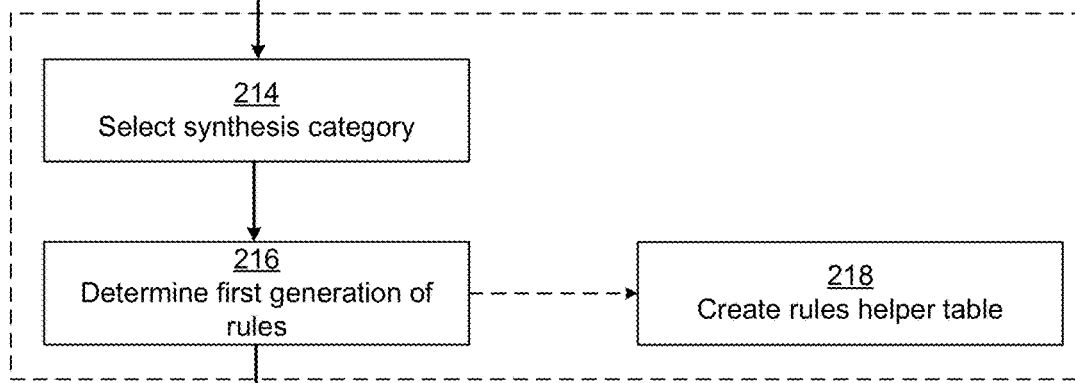
Figure 2:
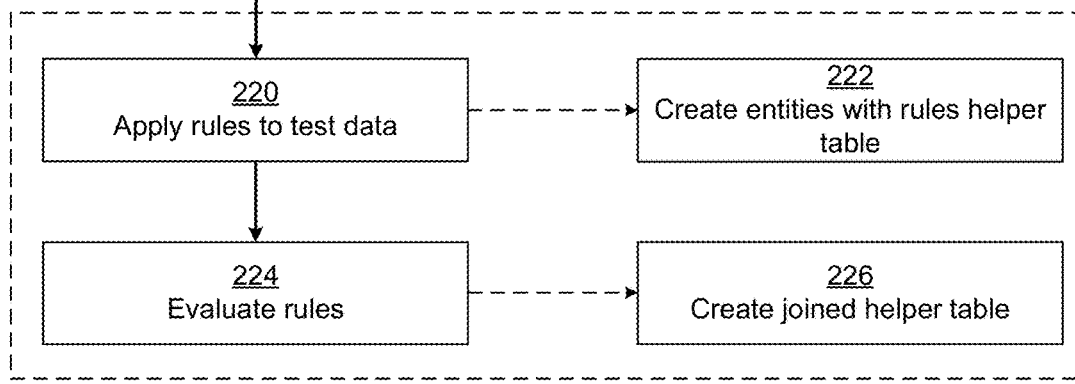

As a result, the metric should be a small negative number when it's acceptable to continue removing predictor rules and should be a large negative number when it's acceptable to stop removing predictors. In the embodiment of FIG. 1, once the metric drops below a termination threshold, the removal of predictor rules will be terminated. This specific termination threshold may be experimentally determined as the point at which further predictor rule removal reaches a point of diminishing returns. In other words, continuing to remove predictor rules after reaching the termination threshold would result in a significant decrease in the number of predictions made without a corresponding significant increase in the cumulative precision of the predictor rule set. When evaluated as a set, the predictor rules generated by the genetic algorithm module 108 are equivalent to the logical expression of OR applied to each individual predictor rule of the set. The iterative approach described above helps to (1) algorithmically simplify the logical expression of the predictor rules and (2) where the logical expression cannot be simplified any further, reduces the predictor events in the expression by progressively removing those predictor events that have the least impact on the performance (precision and recall) of the logical expression. Reducing the number of predictor rules helps reduce the processing time (i.e. improves the performance) of the genetic algorithm to predict target events. FIG. 2 illustrates a process flow for the genetic algorithm, according to an embodiment. The predictor rule generation system 100 aims to create an optimized set of predictor rules that are able to predict a number of target events for an entity having a synthesis category using predictor events. The predictor rule generation system 110 achieves this through the use of a genetic algorithm to algorithmically create several generations of predictor rules. FIG. 2 illustrates the flow of input data and output data and the helper tables created in parallel for the data preparation module 106, the initialization module 112, and the evaluation module 114.

As previously described, the data preparation module 106 pre-processes the raw data stored in the event database 102 and prepares the data for use by the genetic algorithm module 108. In the embodiment of FIG. 2, the data preparation module 106 partitions the data stored in the event database 102 into two sets of data, the model generation set and the model testing set. For each data set, the data preparation module 106 parses 202 the database and organizes the information gathered from the raw data into several helper tables that pre-computes information needed by the genetic algorithm module 108 for each cycle and sub-cycle and allows the genetic algorithm to efficiently access the information without needing to parse through the raw data. In the embodiment of FIG. 2, the raw data consists of records of events that have occurred at specific dates or times by one or more entities. Each record details an entity type and one or more attributes for the entity.

The data preparation module 106 creates 204 a Records helper table, an Events helper table, an Entities helper table, and a Synthesis Categories helper table. The Records helper table organizes all of the information gathered from each record that may be relevant to a predictor rule. Examples of relevant information include event, entity, entity type, attributes, etc. Once the Records helper table is created, the data preparation module 106 searches the Records helper table to identify all of the events and all of the entities present and stores the identified events and entities in the Events helper table and Entities helper table, respectively. The Events helper table and Entities helper table serve as reference tables, wherein each event and each entity has a corresponding unique identifier. The data preparation module 106 then searches the Records helper table to determine possible combinations of entity types and attributes (e.g., all possible synthesis categories) and stores each combination in the Synthesis Categories helper table. The Synthesis Categories helper table serves as a reference table, wherein each synthesis category has a unique identifier. By combining entity type and corresponding attributes into a synthesis category, this allows the genetic algorithm module 108 to split execution across several synthesis categories. The genetic algorithm module 108 has the necessary information set up in a way that streamlines the process such that each sub-cycle may pertain to a single synthesis category, and the genetic algorithm module 108 can efficiently perform several sub-cycles for multiple synthesis categories. In the embodiment of FIG. 2, the data preparation module 106 creates these helper tables for the model generation set and separately for the model testing set.

As each cycle of the genetic algorithm yields predictor rules for a single target event, the data preparation module 106 selects 206 a target event so that relevant information can be pre-computed for that cycle. The data preparation module 106 creates 208 a Categorized Events helper table that stores the entity identifier, event identifier, and corresponding synthesis category identifier for each record of the data set. For each record, the Categorized Events helper table additionally stores a flag or code value that indicates if the event from the record is the designated target event for the current cycle of the genetic algorithm. This code value aids the data preparation module 106 in pre-computing additional information for the genetic algorithm module 108. A separate Categorized Events helper table is created for the model generation set and for the model testing set.

Predictor rules are constructed such that the genetic algorithm module 108 can determine if a synthesis category is associated with a target event if there are records of the synthesis category having one or more predictor events. Thus, the data preparation module 106 determines 210 whether or not an entity having a synthesis category performs the target event so that the pre-computed information can be used when evaluating predictor rules that have been generated. The data preparation module 106 creates 212 the Categorized Entities helper table to store an entity identifier, a corresponding synthesis category identifier, and a coded value that indicates if the entity has a record including the target event. As each Categorized Entities helper table is tailored for a designated target event, a Categorized Entities helper table is created for each cycle of the genetic algorithm for each data set, resulting in two Categorized Entities helper tables (one for the model generation set and one for the model testing set) for each cycle.

Once the data preparation module 106 has pre-computed information for the genetic algorithm and has stored the information in several helper tables, the initialization module 112 may perform a sub-cycle of a cycle, wherein predictor rules will be generated for a specific synthesis category for a specific target event. The initialization module 112 selects 214 a synthesis category as the focus for the sub-cycle. For the selected synthesis category, the initialization module 112 then determines 216 the first generation of predictor rules. To create the initial generation of genes from the model generation set for a sub-cycle, the initialization module 112 iterates through the Categorized Events helper table (for the model generation set) for the target event for the cycle of the genetic algorithm. The initialization module 112 searches the Categorized Events helper table for records having a combination of the target event and the synthesis category for the sub-cycle and determines the entity associated with each record. The initialization module 112 then identifies all other records in the Categorized Events helper table that are associated with that entity to determine other events associated with that entity that may serve as predictors for the target event (i.e., a candidate predictor event). For each candidate predictor event, the initialization module 112 tabulates each instance of a record having the combination of the designated synthesis category and the candidate predictor event in the Categorized Events helper table to obtain the total number of instances of the combination. If the total number of instances of a combination of a synthesis category and a candidate predictor event is above a certain threshold, then the initialization module 112 creates a predictor rule based on the combination. The initialization module 112 creates 218 the Rules helper table to store each predictor rule with a corresponding unique identifier. The Rules helper table serves as a reference table for the genetic algorithm module 108.

Once the initial generation of predictor rules for a sub-cycle is generated by the initialization module 112, the evaluation module 114 applies 220 each predictor rule to the model testing set. As previously described, a predictor rule is a Boolean expression in the following general format:

For <Target Event i>: <Synthesis Category j><Predictor Event k>.

The evaluation module 114 searches the Categorized Events helper table of the model testing data for records having the Synthesis Category j and identifies one or more entities associated with the Synthesis Category j (i.e., a record includes an entity having the synthesis category). The evaluation module 114 then parses the records for each identified entity in the Categorized Events helper table to determine if the entity has a record including the Predictor Event k. If an entity having Synthesis Category j has a record having Predictor Event k, the predictor rule returns TRUE, and if not, the predictor rule returns FALSE. The evaluation module 114 creates 222 an Entities with Rules helper table to store the result of each predictor rule applied to the model testing data. The Entities with Rules helper table serves as a reference table that stores pre-computed information regarding whether or not a rule applies to an entity having a synthesis category, which aids the genetic algorithm module 108 in determining the quality of the predictor rule created using the model generation data.

The evaluation module 114 then evaluates 224 the performance of each predictor rule. The evaluation module 114 evaluates the results of each predictor rule to determine the number of true positives, true negatives, false positives, and false negatives and to ultimately determine the precision and recall measures for each predictor rule. To streamline the evaluation process, the evaluation module 114 creates 226 a joined helper table by joining the Categorized Entities and Entities with Rules helper tables using the synthesis category identifier and entity identifier columns. By comparing the values for Has Target and Has Predictor for each row of the joined helper table, the evaluation module 114 can efficiently determine which are true positives, true negatives, false positives, and false negatives. These metrics are used to determine the precision and recall measures, by which the predictor rules are then ranked. The ranking of a predictor rule determines whether or not the predictor rule will be used for recombination or will be carried over to the offspring generation.

Figure 3:
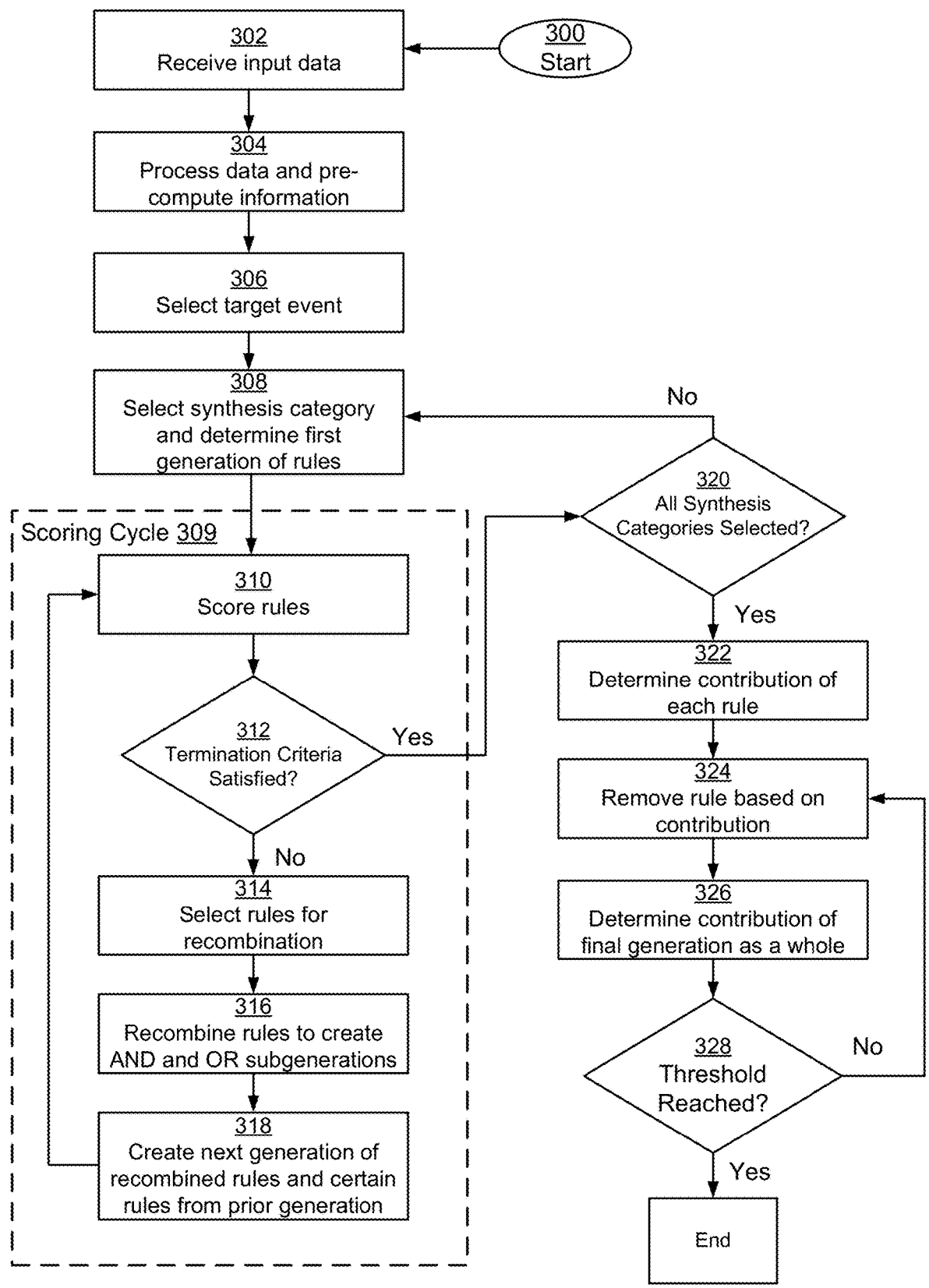
FIG. 3 is a flowchart illustrating the overall operation of the genetic algorithm according to an embodiment of the present invention.

FIG. 3 is a flowchart illustrating the overall operation of the genetic algorithm, according to an embodiment of the present invention. FIG. 3 illustrates a single cycle of the genetic algorithm for generating predictor rules for a single target event. The cycle illustrated in FIG. 3 is repeated for each different target event for which a set of predictor rules is desired. The operation starts 300 with the predictor rule generation system 100 receiving 302 input data such as maintenance records for machine equipment, error logs for automobiles, claim records for medical procedures, etc. The input data may be stored in the event database 102 as raw data. As such, the raw data is processed 304 by the data preparation module 106 to prepare the data for the genetic algorithm module 108; the data preparation module 106 pre-computes the information needed by the genetic algorithm module 108, which allows for more efficient computing.

In processing 304 the data, the data preparation module 106 partitions the input data into a model generation set and a model testing set. For each set, the data preparation module 106 parses through the records of each set and organizes the gathered information into a plurality of helper tables that serve as references tables for the genetic algorithm and also store pre-computed information needed for the genetic algorithm. At this step of the genetic algorithm, the data preparation module 106 has created several helper tables that are each tailored for a specific target event. The plurality of helper tables are stored in the helper table data store 104 for later access by the genetic algorithm module 108.

Once the data preparation module 106 has prepared the data and helper tables for the genetic algorithm module 108, the initialization module 112 selects 306 the target event for the cycle. The initialization module 112 then selects 308 the synthesis category for the sub-cycle and determines the first generation of predictor rules for the sub-cycle. To determine 308 the first generation, the initialization module 112 iterates through the Categorized Events helper table and searches for records having the combination of the designated target event and the designated synthesis category to determine events that may be predictor events for the target event for other entities having the designated synthesis category. If the appearance of certain predictor events is above a threshold, the initialization module 112 creates a predictor rule based on the predictor event combined with the synthesis category of the sub-cycle and the target event of the cycle.

After the first generation of predictor rules is generated 308, the genetic algorithm enters into one or more scoring cycles 309 by the evaluation module 114. The evaluation module 114 scores 310 each generation of predictor rules by applying each predictor rule to the model testing data and then determining its fitness level (i.e., precision and recall measures). The precision and recall measures indicate the predictor rule's ability to accurately retrieve relevant results, wherein a relevant result means that an entity having the synthesis category of the predictor rule has a record with the predictor event(s) of the predictor rule and has a record with the target event of the predictor rule. Scoring 310 each predictor rule allows the genetic algorithm module 108 to keep predictor rules having a higher fitness level while simultaneously increasing the low end on the range of fitness level. The evaluation module 114 ranks the predictor rules according to the precision and recall measures, creating two sub-generations of ranked predictor rules.

After a fitness level of each predictor rule is determined, the evaluation module 114 additionally determines if a termination criteria has been satisfied 312. As previously described, a termination criteria may include parent and offspring generations having identical predictor rules, a fitness level of a generation reaching a threshold, the fitness level between parent and offspring generations not substantially changing, or a fixed number of generations has been created. At this step in the genetic algorithm, the genetic algorithm may continue creating predictor rules or may terminate the creation of rules (for a sub-cycle, a cycle, or for all cycles).

In the event that a termination criteria has not been satisfied, the recombination module 116 selects 314 predictor rules for recombination. The recombination module 116 creates offspring generations, partly by recombining 316 predictor rules from the parent generation. In the embodiment of FIG. 3, the recombination module 116 selects the top number of predictor rules ranked according to the precision measure and creates multiple pairs by pairing each of these predictor rules with each of the other predictor rules in this set. The recombination module 116 creates offspring predictor rules by combining the predictor events from the pair of parent predictor rules using a logical OR combination to create a sub-generation of OR combined rules based on the precision measure. Similarly, the recombination module 116 selects the top number of predictor rules ranked according to the recall measure, creates multiple pairs, and creates offspring predictor rules by combining each of these the predictor rules with each of the other predictor rules in this set using a logical AND combination to create a sub-generation of AND combined rules based on the recall measure. The recombination module 116 may simplify each offspring predictor rule to its simplest logical form. For example, a rule of (A AND (A AND B)) simplifies to (A AND B).

The recombination module 116 creates 318 the complete offspring generation by carrying over some of the predictor rules from the parent generation and adding them to the sub-generations of the offspring predictor rules. Once an offspring generation is created 318, the genetic algorithm performs another cycle of applying the offspring generation of predictor rules to the model testing data and scoring 310 the offspring predictor rules to determine which predictor rules will make it to the following generation. The genetic algorithm may perform this cycle 309 of creating and scoring offspring generations of predictor rules for the designated synthesis category and designated target event until a termination criteria is satisfied.

In the event that a termination criteria has been satisfied for the genetic algorithm (such that a large population of predictor rules for a variety of synthesis categories and target events has been create), the recombination module 116 determines if all possible synthesis categories have been selected 320 as the synthesis category for a sub-cycle. In the event that all possible synthesis categories have not been selected, the genetic algorithm loops back to the initialization module 112 to perform another sub-cycle with a different synthesis category.

In the event that all possible synthesis categories have been selected, the paring module 118 determines 322 the contribution of each predictor rule in the large population. The paring module 118 aims to pare down the population of predictor rules to cultivate an optimized set of predictor rules that is able to predict a majority of the target events that are associated with a specific synthesis category having predictor events. To do so, the paring module 118 searches the total population of predictor rules and identifies the predictor rules associated with a specific synthesis category. The identified predictor rules may be predictors for different target events. In the embodiment of FIG. 3, the paring module 118 evaluates each predictor rule's contribution and accordingly removes 324 predictor rules that are redundant or overly-fitted. After a rule is removed, the paring module 118 determines 326 the contribution of the set of remaining predictor rules as a whole. The paring module 118 calculates a true positive count measure and a precision measure for the set of predictor rules. The ratio of the two measures indicates the overall contribution of the set. If the ratio has not reached 328 a specified threshold, then the cycle of removing predictor rules and determining 326 the contribution of the set of predictors as a whole continues. If the ratio reaches 328 a specified threshold, the genetic algorithm terminates and the final, optimized set of predictor rules has been created. The optimized set of predictor rules may be used to determine a majority number of events associated with an entity having a specific synthesis category.

Figure 4:
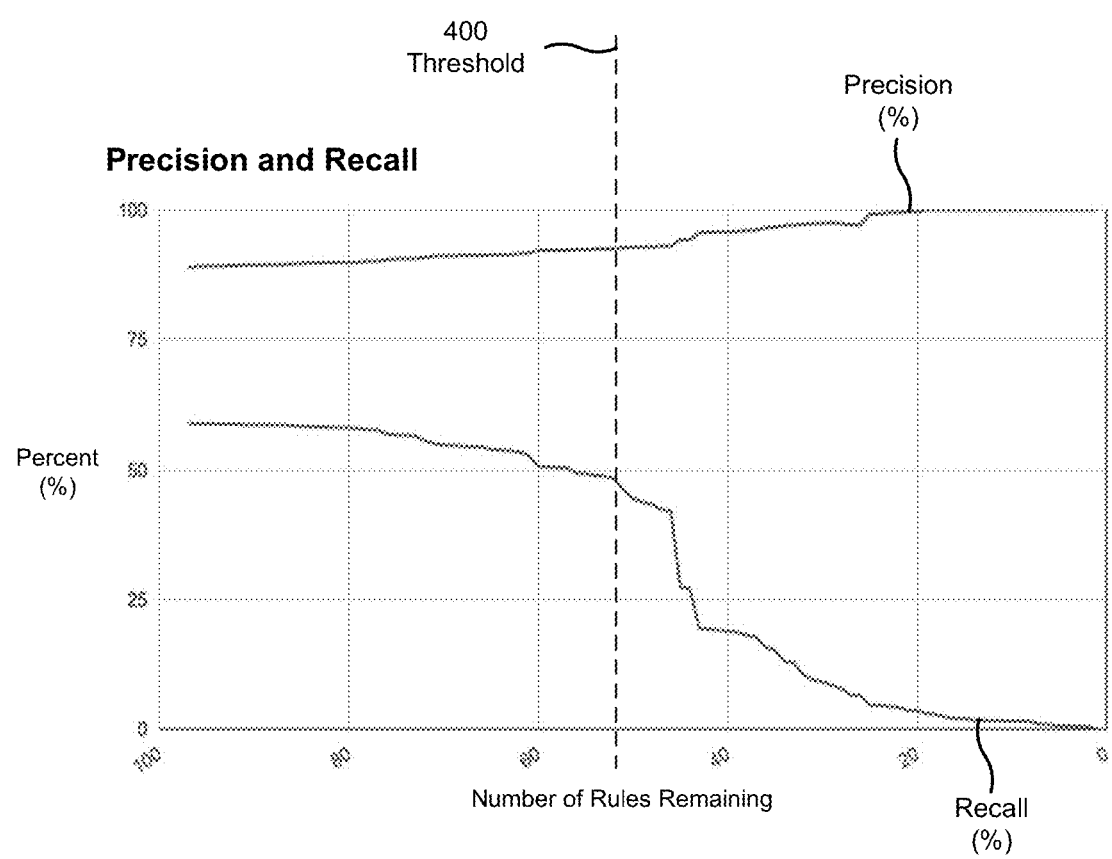
FIG. 4 illustrates a fitness level of a rule population during a rule paring process.

FIG. 4 illustrates a fitness level of a rule population during a rule paring process. As described with regards to FIG. 1, the paring module 118 pares down the population of predictor rules to cultivate an optimized set of predictor rules. The paring process is done iteratively by evaluating each predictor rule's contribution, accordingly removing the predictor rule with the lowest unique contribution, and then evaluating the contribution of the remaining predictor rules. FIG. 4 illustrates the precision and recall measures of the population of rules remaining after each paring iteration. In the embodiment of FIG. 4, the x-axis represents the number of rules remaining in the rule population, and the y-axis represents the fitness measures of the rule population as a percentage. As shown in FIG. 4, as the rule paring process progresses and the number of rules remaining in the rule population decreases, the overall precision of the rule population increases while the overall recall of the rule population slightly decreases. However, beyond threshold 400, removing predictor rules results in a significant decrease in recall without a corresponding significant increase in precision of the rule population. In other words, the increase in precision is negligible compared to the loss in recall, and thus, the rule paring process reaches a point of diminishing returns.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A method of generating a population of predictor rules using a genetic algorithm for predicting at least one target event associated with a given entity, the entity having a combination of an entity type and one or more attributes, the method executed by a processor, and comprising:
   obtaining, by the processor, records data from an event database, wherein the records data comprises a first subset of records forming a model generation set and a second subset of records forming a model testing set;
   determining, by the processor, a first generation of predictor rules using records in the model generation set, each predictor rule consisting of a combination of the entity type and the one or more attributes and a logical expression of at least one predictor event;
   constructing, by the processor, a predictor rule population by iteratively:
      determining for each predictor rule a precision measure based upon a number of records in the model testing set of records that match all of the predictor events in the logical expression of the predictor rule;
      determining for each predictor rule a recall measure based upon a number of records in the model testing set of records that match at least one of the predictor events in the logical expression of the predictor rule;
      selecting a first subset of the predictor rules based upon the precision measure;
      selecting a second subset of the predictor rule based upon the recall measure;
      generating a subsequent generation of predictor rules for the predictor rule population by combining the predictor events in pairs of the predictor rules of the first subset and pairs of the predictor rules of the second subset;
      terminating construction of the predictor rule population in response to a termination criteria being met;
   responsive to the termination criteria being met, paring the predictor rule population by removing at least one predictor rule from the predictor rule population, wherein the at least one removed predictor rule has a lowest number of matches of predictor events in the model testing set of records data that were not matched by any other predictor rule in the predictor rule population;
   determining a paring criteria for the remaining predictor rules of the predictor rule population; and
   terminating paring of the predictor rule population in response to the paring criteria being met.

2. The method of claim 1, wherein determining a first generation of predictor rules comprises:
   extracting the records data of the model generation set, wherein each record of the records data comprises an entity, an entity type, one or more attributes, and an event;

determining the combinations of entity type and one or more attributes with event;

creating, for each combination having a number of instances above a threshold, a predictor rule using the entity type, the one or more attributes, and the event of the combination.

3. The method of claim 1, further comprising, after each generation is generated, removing predictor rules from the generation that have logical combinations of predictor events that are logically equivalent to at least one other predictor rule in the generation.

4. The method of claim 1, wherein selecting a first subset of the predictor rules based upon the precision measure comprises selecting a predictor rule that has a threshold rank above other predictor rules in the same generation based on the precision measure of the predictor rule.

5. The method of claim 1, wherein selecting a second subset of the predictor rule based upon the recall measure comprises selecting a predictor rule that has a threshold rank above other predictor rules in the same generation based on the recall measure of the predictor rule.

6. The method of claim 1, wherein generating a subsequent generation of predictor rules further comprises carrying over the first subset and the second subset of predictor rules to the subsequent generation.

7. The method of claim 1, wherein terminating construction of the predictor rule population in response to a termination criteria being met comprises determining at least one of a pre-determined number of generations have been created, a precision measure and a recall measure of a generation reaches a threshold, a precision measure and a recall measure of a subsequent generation are within a predetermined threshold of difference from a prior generation, and a generation and a subsequent generation comprise identical predictor rules.

8. The method of claim 1, wherein the paring criteria comprises a ratio of a change in a true positive count and a change in precision, wherein the change is measured between a generation and a subsequent generation.

9. The method of claim 1, wherein each predictor rule of the predictor rule population predicts an event associated with an entity of a specific entity type and one or more specific attributes based on past events associated with entities having the specific entity type and one or more of the specific attributes.

10. A non-transitory computer-readable storage medium storing instructions that, when executed by a processor, cause the processor to perform operations for generating a population of predictor rules using a genetic algorithm for predicting at least one target event associated with a given entity, the entity having a combination of an entity type and one or more attributes, the instructions comprising:

obtaining, by the processor, records data from an event database, wherein the records data comprises a first subset of records forming a model generation set and a second subset of records forming a model testing set;

determining, by the processor, a first generation of predictor rules using records in the model generation set, each predictor rule consisting of a combination of the entity type and the one or more attributes and a logical expression of at least one predictor event;

constructing, by the processor, a predictor rule population by iteratively:

determining for each predictor rule a precision measure based upon a number of records in the model testing set of records that match all of the predictor events in the logical expression of the predictor rule;

determining for each predictor rule a recall measure based upon a number of records in the model testing set of records that match at least one of the predictor events in the logical expression of the predictor rule;

selecting a first subset of the predictor rules based upon the precision measure;

selecting a second subset of the predictor rule based upon the recall measure;

generating a subsequent generation of predictor rules for the predictor rule population by combining the predictor events in pairs of the predictor rules of the first subset and by pairs of the predictor rules of the second subset;

terminating construction of the predictor rule population in response to a termination criteria being met;

responsive to the termination criteria being met, paring the predictor rule population by removing at least one predictor rule from the predictor rule population, wherein the at least one removed predictor rule has a lowest number of matches of predictor events in the model testing set of records data that were not matched by any other predictor rule in the predictor rule population;

determining a paring criteria for the remaining predictor rules of the predictor rule population; and terminating paring of the predictor rule population in response to the paring criteria being met.

11. The computer-readable medium of claim 10, wherein determining a first generation of predictor rules comprises:

extracting the records data of the model generation set, wherein each record of the records data comprises an entity, an entity type, one or more attributes, and an event;

determining the combinations of entity type and one or more attributes with event;

creating, for each combination having a number of instances above a threshold, a predictor rule using the entity type, the one or more attributes, and the event of the combination.

12. The computer-readable medium of claim 10, the instructions further comprising instructions for, after each generation is generated, removing predictor rules from the generation that have logical combinations of predictor events that are logically equivalent to at least one other predictor rule in the generation.

13. The computer-readable medium of claim 10, wherein selecting a first subset of the predictor rules based upon the precision measure comprises selecting a predictor rule that has a threshold rank above other predictor rules in the same generation based on the precision measure of the predictor rule.

14. The computer-readable medium of claim 10, wherein selecting a second subset of the predictor rule based upon the recall measure comprises selecting a predictor rule that has a threshold rank above other predictor rules in the same generation based on the recall measure of the predictor rule.

15. The computer-readable medium of claim 10, wherein generating a subsequent generation of predictor rules further comprises carrying over the first subset and the second subset of predictor rules to the subsequent generation.

16. The computer-readable medium of claim 10, wherein terminating construction of the predictor rule population in response to a termination criteria being met comprises determining at least one of a pre-determined number of generations have been created, a precision measure and a recall measure of a generation reaches a threshold, a precision measure and a recall measure of a subsequent generation are within a predetermined threshold of difference from a prior generation, and a generation and a subsequent generation comprise identical predictor rules.

17. The computer-readable medium of claim 10, wherein the paring criteria comprises a ratio of a change in a true positive count and a change in precision, wherein the change is measured between a generation and a subsequent generation.

18. The computer-readable medium of claim 10, wherein each predictor rule of the predictor rule population predicts an event associated with an entity of a specific entity type and one or more specific attributes based on past events associated with entities having the specific entity type and one or more of the specific attributes.

19. A system comprising:
   a processor; and
   a non-transitory computer-readable storage medium storing instructions that, when executed by a processor, cause the processor to generate a population of predictor rules using a genetic algorithm for predicting at least one target event associated with a given entity, the entity having a combination of an entity type and one or more attributes, the instructions causing the processor to:
      obtaining, by the processor, records data from an event database, wherein the records data comprises a first subset of records forming a model generation set and a second subset of records forming a model testing set;
      determining, by the processor, a first generation of predictor rules using records in the model generation set, each predictor rule consisting of a combination of the entity type and the one or more attributes and a logical expression of at least one predictor event;
      constructing, by the processor, a predictor rule population by iteratively:
         determining for each predictor rule a precision measure based upon a number of records in the model testing set of records that match all of the predictor events in the logical expression of the predictor rule;
         determining for each predictor rule a recall measure based upon a number of records in the model testing set of records that match at least one of the predictor events in the logical expression of the predictor rule;
         selecting a first subset of the predictor rules based upon the precision measure;
         selecting a second subset of the predictor rule based upon the recall measure;
         generating a subsequent generation of predictor rules for the predictor rule population by combining the predictor events in pairs of the predictor rules of the first subset and pairs of the predictor rules of the second subset;
         terminating construction of the predictor rule population in response to a termination criteria being met;
         responsive to the termination criteria being met, paring the predictor rule population by removing at least one predictor rule from the predictor rule population, wherein the at least one removed predictor rule has a lowest number of matches of predictor events in the model testing set of records data that were not matched by any other predictor rule in the predictor rule population;
         determining a paring criteria for the remaining predictor rules of the predictor rule population; and
         terminating paring of the predictor rule population in response to the paring criteria being met.

20. The system of claim 19, wherein terminating construction of the predictor rule population in response to a termination criteria being met comprises determining at least one of a pre-determined number of generations have been created, a precision measure and a recall measure of a generation reaches a threshold, a precision measure and a recall measure of a subsequent generation are within a predetermined threshold of difference from a prior generation, and a generation and a subsequent generation comprise identical predictor rules.

* * * * *